United States Patent [19]
Yoshimura et al.

[11] Patent Number: 6,157,769
[45] Date of Patent: Dec. 5, 2000

[54] INFORMATION RECORD MEDIUM, APPARATUS FOR RECORDING THE SAME AND APPARATUS FOR REPRODUCING THE SAME

[75] Inventors: Ryuichiro Yoshimura, Tokorozawa; Takao Sawabe, Tokyo-to; Yoshiaki Moriyama, Tsurugashima; Kaoru Yamamoto, Tsurugashima; Akihiro Tozaki, Tsurugashima; Hisayuki Nakayama, Tokyo-to; Junichi Yoshio, Tokorozawa, all of Japan

[73] Assignees: Pioneer Electronic Corporation; Pioneer LDC, Inc., both of Tokyo-to, Japan

[21] Appl. No.: 08/819,012

[22] Filed: Mar. 17, 1997

[30] Foreign Application Priority Data

Mar. 18, 1996 [JP] Japan .................................. 8-061471

[51] Int. Cl.[7] ..................................................... H04N 5/91
[52] U.S. Cl. ............................................... 386/68; 386/95
[58] Field of Search ..................................... 386/4, 33, 45, 386/52, 64, 95, 98, 125, 126, 69–70; H04N 5/92, 5/76, 9/79

[56] References Cited

U.S. PATENT DOCUMENTS

| | | | |
|---|---|---|---|
| 5,471,316 | 11/1995 | Sugawara et al. | 386/82 |
| 5,734,787 | 3/1998 | Yonemitsu et al. | 386/126 |
| 5,734,788 | 3/1998 | Nonomura et al. | 386/126 |
| 5,758,008 | 5/1998 | Tozaki et al. | 386/95 |
| 5,771,334 | 6/1998 | Yamauchi et al. | 386/95 |
| 5,778,142 | 7/1998 | Taira et al. | 386/97 |
| 5,787,222 | 7/1998 | Tozaki et al. | 386/46 |
| 5,854,873 | 12/1998 | Mori et al. | 386/95 |
| 5,870,523 | 2/1999 | Kikuchi et al. | 386/95 |

*Primary Examiner*—Thai Tran
*Attorney, Agent, or Firm*—Morgan, Lewis & Bockius LLP

[57] ABSTRACT

An information recording apparatus (SS1) is provided with: a signal process device (72) for dividing record information (R) to be recorded into a plurality of partial record informations including at least video information, for applying a predetermined signal process to each of the partial record informations to thereby output processed partial record information (Sr, 42, 43, 44), and for generating and outputting, on the basis of control information (Si) which is inputted from the external to control a reproduction of the record information, additional information (Sac, 64: PGCI) including still time information (66E) indicative of a time for performing a still picture reproduction of a final picture of each of the partial record informations which is a picture included in each of the partial record informations at a final portion thereof after reproducing each of the partial record informations, at a time of reproducing the record information, the still time information being set for each of the partial record informations; a multiplex device (75, 76) for multiplexing the processed partial record information and the additional information to thereby generate multiplexed processed record information (Sap); and a record device (77, 78) for recording the multiplexed processed record information onto an information record medium (1: DVD).

30 Claims, 11 Drawing Sheets

STRUCTURE OF PGCI

OPERATION BY STILL KEY AND PAUSE KEY

INFORMATION RECORD MEDIUM, APPARATUS FOR RECORDING THE SAME AND APPARATUS FOR REPRODUCING THE SAME

BACKGROUND OF THE INVENTION

1. Field of the Invention

The present invention relates to an information record medium such as an optical disk of a high recording density type, which is capable of recording information such as video information, audio information and the like at a high density, and which is represented by a DVD (Digital Video or Versatile Disk). The present invention also relates to a recording apparatus for recording the information onto the information record medium, and a reproducing apparatus for reproducing the information from the information record medium.

2. Description of the Related Art

Conventionally, a so-called LD (Laser Disk) and a so-called CD (Compact Disk) are generalized as optical disks, on which information such as video information, audio information and the like is recorded.

On the LD or the like, the video information and the audio information are recorded together with time information indicating a time at which each information is to be reproduced with respect to a reproduction start position, which each LD or the like has, as a standard position. Thus, other than a general normal reproduction to reproduce the recorded information in the order of recording, various special reproductions are possible, such as a reproduction to extract and listen to an only desirable music out of a plurality of recorded musics, a reproduction to listen to the recorded musics in a random order and so on, in case of the CD, for example.

However, the above mentioned LD and the like have such a problem that it is not possible to perform a variegated reproduction. For example, when it is desired to stop a presently displayed picture to thereby display it as a still picture, it can be attained only by carrying out a temporary stop operation according to the intention of the audience to thereby reproduce it as the still picture. On the contrary, the picture cannot be stopped according to the intention of an author who produces the information to be recorded (hereafter, simply referred to as an author).

On the other hand, various proposals and developments are being made as for the DVD, as an optical disk in which the memory capacity is improved by about ten times without changing the size of the optical disk itself as compared with the aforementioned conventional CD. However, in the above mentioned case, a recording apparatus and a reproducing apparatus for the record information are not proposed and developed, which can perform a still picture reproduction according to the author's intention for the record information to thereby carry out the variegated reproduction. Moreover, the actuality is such that a person having an ordinary skill in this art does not even recognize a subject itself to realize an recording apparatus and an reproducing apparatus for the record information, which can perform the still picture reproduction according to the author's intention for the record information to thereby carry out the variegated reproduction.

SUMMARY OF THE INVENTION

It is therefore an object of the present invention to provide: an information recording apparatus for recording the information in such a manner as to allow the still picture reproduction according to the author's intention for the record information to thereby carry out the variegated reproduction; an information record medium on which the information is recorded in that manner by the information recording apparatus; and an information reproducing apparatus for reproducing the recorded information.

The above object of the present invention can be achieved by an information recording apparatus, provided with: a signal process device for dividing record information to be recorded into a plurality of partial record informations including at least video information, for applying a predetermined signal process, such as a process based on the MPEG 2 method etc., to each of the partial record informations to thereby output processed partial record information, and for generating and outputting, on the basis of control information which is inputted from the external to control a reproduction of the record information, additional information including still time information indicative of a time for performing a still picture reproduction of a final picture of each of the partial record informations which is a picture included in each of the partial record informations at a final portion thereof after reproducing each of the partial record informations, at a time of reproducing the record information, the still time information being set for each of the partial record informations; a multiplex device for multiplexing the processed partial record information and the additional information to thereby generate multiplexed processed record information; and a record device, such as a mastering device etc., for recording the multiplexed processed record information onto an information record medium, such as a DVD etc..

According to the information recording apparatus of the present invention, the record information to be recorded is divided into a plurality of partial record informations including at least video information, by the signal process device. Then, a predetermined signal process is applied to each of the partial record informations, so that the processed partial record information is outputted, by the signal process device. On the basis of the control information, the additional information including the still time information indicative of a time for performing a still picture reproduction of a final picture of each of the partial record informations after reproducing each of the partial record informations, at a time of reproducing the record information, is generated and outputted by the signal process device. Then, the processed partial record information and the additional information are multiplexed by the multiplex device, so that the multiplexed processed record information is generated. Finally, the multiplexed processed record information is recorded onto the information record medium, by the record device.

Accordingly, since the additional information including the still time information is recorded together with the processed partial record information, by performing the still picture reproduction of the final picture of the partial record information on the basis of the still time information at a time of reproducing the record information, it is possible to reproduce the final picture of the partial record information as either the dynamic picture or the still picture, and also possible to perform the still picture reproduction in which the time period or duration of the still picture reproduction is changed for each of the partial record informations according to the author's intention.

As a result, it is possible to perform the variegated reproduction for the record information while reducing the amount of the recorded information, at a time of reproducing the record information.

In one aspect of the information recording apparatus of the present invention, the still time information includes: time specifying still time information to perform the still picture reproduction of the final picture for a predetermined time period set in advance; and infinite still time information to continue the still picture reproduction of the final picture until a still picture reproduction cancel signal to stop the still picture reproduction is inputted from the external during the still picture reproduction.

According to this aspect, since the still time information includes both of the time specifying still time information and the infinite still time information, by controlling the reproduction on the basis of one of these still time informations, it is possible to perform the still picture reproduction in which the time is specified according to the author's intention, and also possible to continue the still picture reproduction until the stop of the still picture reproduction is specified by the audience.

In another aspect of the information recording apparatus of the present invention, the additional information further includes still specifying informations to perform, after reproducing divided partial record informations, such as GOPs (Group Of Pictures) etc., into which the processed partial record information is further divided, the still picture reproduction of the final picture contained in each of the divided partial record informations.

According to this aspect, since the additional information further includes the still specifying information, it is possible to perform the still picture reproduction for each of the divided partial record informations at a time of reproducing the record information according to the author's intention.

In another aspect of the information recording apparatus of the present invention, the additional information includes a plurality of still time informations, which correspond to same one of the partial record informations and which respectively indicate times to perform the still picture reproduction different from each other. And that, the multiplex device multiplexes the processed partial record information and the additional information so as to record the additional information at a record position on the information record medium, which is different from a portion where the record information is recorded and which is reproduced prior to the reproduction of the record information.

According to this aspect, the additional information includes a plurality of still time informations corresponding to the same one of the partial record informations, and the multiplex device multiplexes the processed record information and the additional information so as to record the additional information at a record position on the information record medium, which is different from the portion where the record information is recorded and which is reproduced prior to the reproduction of the record information. As a result, it is possible to reproduce one partial record information by various reproducing conditions in the number corresponding the number of still time informations. It is also possible to collectively select and obtain the still time information or the still specifying information contained in the additional information before reproducing the record information.

As a result, it is possible to effectively perform the still picture reproduction by obtaining in advance the still time information or the still specifying information, and also possible to protect an error operation of the still picture reproduction due to the mixed reproduction of the record information and the still time information or the still specifying information, and further possible to reproduce one partial record information by various reproducing conditions.

The above object of the present invention can be also achieved by an information record medium, such as the DVD etc., recorded with record information to be reproduced by an information reproducing apparatus for reproducing the record information on the basis of additional information recorded on the information record medium besides the record information. The information record medium comprises a data structure stored in the information record medium and including: processed partial record information generated by applying a predetermined signal process, such as a process based on the MPEG 2 method etc., to each of partial record informations into which the record information is divided and which include at least video information; and still time information, which is included in the additional information and which indicates a time for performing a still picture reproduction of a final picture of each of the partial record informations, which is a picture included in each of the partial record informations at a final portion thereof, after reproducing each of the partial record informations at a time of reproducing the record information. The still time information is set for each of the partial record informations. And that, the processed partial record information and the additional information are multiplexed and recorded on the information record medium.

According to the information record medium of the present invention, since it has such a data structure that the processed partial record information and the additional information including the still time information are multiplexed, it is possible to reproduce the final picture of the partial record information as either the dynamic picture or the still picture, and also possible to perform the still picture reproduction in which the time period or duration of the still picture reproduction is changed for each of the partial record informations according to the author's intention.

As a result, it is possible to perform the variegated reproduction for the record information while reducing the amount of the recorded information, at a time of reproducing the record information.

In one aspect of the information record medium of the present invention, the still time information includes: time specifying still time information to perform the still picture reproduction of the final picture for a predetermined time period set in advance; and infinite still time information to continue the still picture reproduction of the final picture until a still picture reproduction cancel signal to stop the still picture reproduction is inputted from the external during the still picture reproduction.

According to this aspect, since the still time information includes the time specifying still time information and the infinite still time information, it is possible to perform the still picture reproduction in which the time is specified according to the author's intention, and also possible to continue the still picture reproduction until the stop of the still picture reproduction is specified by the audience.

In another aspect of the information record medium of the present invention, the additional information further includes still specifying information to perform, after reproducing divided partial record informations into which the processed partial record information is further divided, the still picture reproduction of the final picture contained in each of the divided partial record informations.

According to this aspect, since the additional information further includes the still specifying information, it is possible to perform the still picture reproduction for each of the divided partial record informations at a time of reproducing the record information according to the author's intention.

In another aspect of the information record medium of the present invention, the additional information includes a plurality of still time informations, which correspond to same one of the partial record informations and which respectively indicate times to perform the still picture reproduction different from each other. And that, the additional information is recorded at a record position on the information record medium, which is different from a portion where the record information is recorded and which is reproduced prior to the reproduction of the record information.

According to this aspect, it is possible to reproduce one partial record information by various reproducing conditions in the number corresponding the number of still time informations. It is also possible to collectively select and obtain the still time information or the still specifying information contained in the additional information before reproducing the record information.

As a result, it is possible to effectively perform the still picture reproduction by obtaining in advance the still time information or the still specifying information, and also possible to protect an error operation of the still picture reproduction due to the mixed reproduction of the record information and the still time information or the still specifying information, and further possible to reproduce one partial record information by various reproducing conditions.

The above object of the present invention can be also achieved by an information reproducing apparatus for reproducing record information from the above described information record medium of the present invention. The information reproducing apparatus is provided with: a detection and demodulation device, such as an optical pickup, a demodulation and error-correction unit etc., for detecting and demodulating the processed partial record information and the additional information from the information record medium to thereby output a demodulation signal; an extract device, such as a system buffer etc., for extracting the additional information from the demodulation signal; and a control device, such as a system controller etc., for controlling the still picture reproduction of the final picture of each of the partial record informations, on the basis of the still time information included in the extracted additional information.

According to the information reproducing apparatus of the present invention, the processed partial record information and the additional information are detected and demodulated from the information record medium, so that the demodulation signal is outputted, by the detection and demodulation device. Then, the additional information is extracted from the demodulation signal, by the extract device. Then, the still picture reproduction of the final picture of each of the partial record informations is controlled by the control device on the basis of the still time information included in the extracted additional information.

Therefore, it is possible to reproduce the final picture of the partial record information as either the dynamic picture or the still picture, and also possible to perform the still picture reproduction in which the time period or duration of the still picture reproduction is changed for each of the partial record informations according to the author's intention.

As a result, it is possible to perform the variegated reproduction for the record information while reducing the amount of the recorded information, at a time of reproducing the record information.

In one aspect of the information reproducing apparatus of the present invention, the additional information further includes still specifying information to perform, after reproducing divided partial record informations such as the GOPs etc., into which the processed partial record information is further divided, the still picture reproduction of the final picture contained in each of the divided partial record informations. And that, the control device controls the still picture reproduction of the final picture included in each of the divided partial record informations on the basis of the still specifying information.

According to this aspect, it is possible to perform the still picture reproduction for each of the divided partial record informations at a time of reproducing the record information according to the author's intention.

In another aspect of the information reproducing apparatus of the present invention, the additional information includes a plurality of still time informations, which correspond to same one of the partial record informations and which respectively indicate times to perform the still picture reproduction different from each other. And that, the control device controls the detection and demodulation device and the extract device to reproduce the additional information prior to the reproduction of the record information other than the additional information.

According to this aspect, it is possible to reproduce one partial record information by various reproducing conditions in the number corresponding the number of still time informations. It is also possible to collectively select and obtain the still time information or the still specifying information contained in the additional information before reproducing the record information.

As a result, it is possible to effectively perform the still picture reproduction by obtaining in advance the still time information or the still specifying information, and also possible to protect an error operation of the still picture reproduction due to the mixed reproduction of the record information and the still time information or the still specifying information, and further possible to reproduce one partial record information by various reproducing conditions.

In another aspect of the information reproducing apparatus of the present invention, the still time information includes: time specifying still time information to perform the still picture reproduction of the final picture for a predetermined time period set in advance; and infinite still time information to continue the still picture reproduction of the final picture until a still picture reproduction cancel signal to stop the still picture reproduction is inputted from the external during the still picture reproduction. And that, the control device controls the still picture reproduction of the final picture, on the basis of the time specifying still time information and the infinite still time information.

As a result, it is possible to perform the still picture reproduction which time is specified by the author's intention, and also possible to continue the still picture reproduction until the stop instruction of the still picture reproduction is given by the audience.

In this aspect, it is preferable that: the information reproducing apparatus is further provided with an input device for inputting the still picture reproduction cancel signal therethrough; and the control device controls the still picture reproduction cancel signal to be ineffective when the still picture reproduction cancel signal is inputted through the input device in case that the still picture reproduction of the final picture is performed on the basis of the time specifying still time information, and to be effective when the still picture reproduction cancel signal is inputted through the input device in case that the still picture reproduction of the final picture is performed on the basis of the infinite still time information.

According to this aspect, the still picture reproduction cancel signal is inputted through the input device. Then, the control device controls the still picture reproduction cancel signal to be ineffective when the still picture reproduction cancel signal is inputted in case that the still picture reproduction of the final picture is performed on the basis of the time specifying still time information, and to be effective when the still picture reproduction cancel signal is inputted in case that the still picture reproduction of the final picture is performed on the basis of the infinite still time information.

Therefore, it is possible to prevent the time period or duration of the still picture reproduction, which is specified by the time specifying still time information, from being cut or shortened carelessly, and also possible to stop the still picture reproduction by the audience's intention in case that the still picture reproduction of the final picture is performed on the basis of the infinite still time information since the still picture reproduction cancel signal is made effective.

As a result, it is possible to perform the reproduction reflecting the author's intention, as well as the reproduction reflecting the audience's intention.

In this case, it is preferable that: the information reproducing apparatus is further provided with a display device; and the control device controls the display device to display such a message that the still picture reproduction cancel signal is ineffective when the still picture reproduction cancel signal is inputted through the input device in case that the still picture reproduction of the final picture is performed on the basis of the time specifying still time information.

As a result, since the message is displayed under the control of the control device, it is possible for the audience to recognize that the still picture reproduction cancel signal is ineffective in this case. Thus, it is possible to perform the reproduction of the record information which operation condition can be easily understood by the audience.

In this case, it is also preferable that: the information reproducing apparatus is further provided with a display device; and the control device controls the display device to display such a message that the still picture reproduction cancel signal is effective when the still picture reproduction cancel signal is inputted through the input device in case that the still picture reproduction of the final picture is performed on the basis of the infinite still time information.

As a result, since the message is displayed under the control of the control device, it is possible for the audience to recognize that the still picture reproduction cancel signal is effective in this case. Thus, it is possible to perform the reproduction of the record information which operation condition can be easily understood by the audience.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Referring to the accompanying drawings, embodiments of the present invention will be now explained. The following explanations will be done for the embodiments, in which the present invention is applied to the aforementioned DVD.

In the following embodiments, constitutional elements listed on a right hand side in a following list respectively construct examples of constitutional elements of the present invention listed on a left hand side in the following list.

| | |
|---|---|
| divided partial record information | GOP |
| partial record information | substantial portion such as video data etc. to construct a cell, before a predetermined process |
| processed partial record information | substantial portion such as video data etc. in the cell other than a navi-pack |
| still time information, and time specifying or infinite still time information | still time period specifying information |
| still specifying information | reproduction control information |
| still picture reproduction cancel signal | cancel signal |

(I) Embodiment of Information Record Medium

First of all, a physical structure and a logical structure as well as an operation of a DVD, as one embodiment of the information record medium to which the present invention is applied, will be explained with reference to FIGS. 1 to 6.

Figure 1:
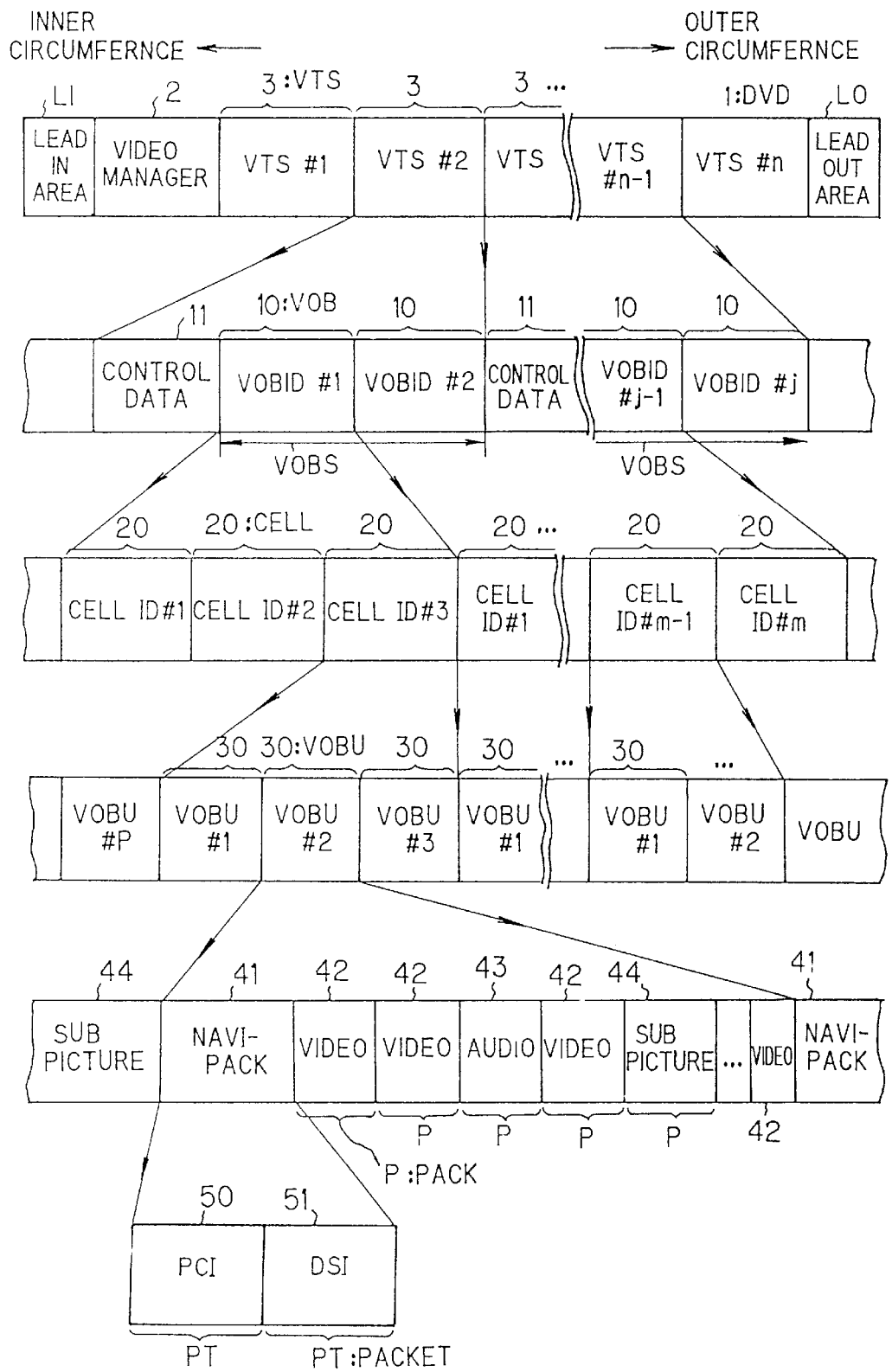
FIG. 1 is a diagram showing a physical structure of record information of a DVD as one embodiment of the present invention.

At first, a record format of video information and audio information on the DVD (i.e. a physical record format) is explained by use of FIG. 1.

As shown in FIG. 1, a DVD 1 as the present embodiment is provided with a lead in area LI at its most inner circumferential portion and a lead out area LO at its most outer circumferential portion, between which video information and audio information are recorded such that they are divided into a plurality of VTSs 3, each of which has a unique ID (Identification) number (i.e. VTS#1 to VTS#n). Here, the VTS (Video Title Set) 3 is a set (bundle) of titles (each of which is one production or one work which an author or producer intends to offer to the audience), which are related to each other (e.g., which attribute, such as the number, the specification, the corresponding languages etc. of the audio information and sub picture information included therein, is the same to each other). More concretely, a plurality of movies which are related to the same movie to each other but which languages of serifs (lines) are different from each other may be recorded as different titles respectively, or even in case of the same movies, the theater version and the special version may be recorded as different titles respectively. Ahead of the area where the VTSs 3 are recorded, a video manager 2 is recorded as shown in FIG. 1. As the information recorded in the video manager 2, for example, information related to the whole video and audio information recorded on the DVD 1, such as a menu for showing a name of each title, information for preventing an illegal copy, an access table for accessing each title and so on, is recorded.

One VTS 3 is recorded such that it is divided into a plurality of VOBs 10, each of which has an ID number (VOB ID#1, VOB ID#2, . . . ), and control data 11 disposed ahead of the VOBs 10. Here, a data portion constructed by a plurality of VOBs 10 is defined as a VOB set (VOBS) as shown in FIG. 1. This VOB set is defined to distinguish the VOB 10, which constructs one portion of the VTS 3 as the substantial portion of the video and audio information, from the control data 11, which constructs another portion of the VTS 3.

In the control data 11 recorded at the head of the VTS 3, information such as PGCI (ProGram Chain Information), which is various information related to a program chain as a logical division obtained by combining a plurality of cells (the "cell" will be described later in detail), is recorded. In each VOB 10, the substantial portion of the video and audio information (i.e. the video and audio information itself other than control information) besides the control information are recorded.

Further, one VOB 10 is constructed of a plurality of cells 20, each of which has an ID number (cell ID#1, cell ID#2, . . . ). Here, one VOB 10 is constructed such that it is completed by the plurality of cells 20 and that one cell 20 does not strides over two VOBs 10.

Nextly, one cell 20 is constructed of a plurality of VOB units (VOBUs) 30, each of which has an ID number (VOBU#1, VOBU#2, . . . ). Here, the VOB unit 30 is an information unit, each of which includes at least one of the video information, the audio information and sub picture information (which is defined as information of a sub picture such as a subtitle of a movie etc.), or each of which includes only a navi(navigation)-pack described later.

One VOB unit 30 is provided with: a navi-pack (a navigation pack) 41 for storing control information to control the video information etc. included in the pertinent VOB unit 30, as a control object; a video data 42 as the video information; an audio data 43 as the audio information; and a sub picture data 44 as the sub picture information. Here, in a pack P for the video data 42, only the video data is recorded. In a pack P for the audio data 43, only the audio data is recorded. Further, in a pack P for the sub picture data 44, only graphic data of a character, a diagram or the like as the sub picture, is recorded. In the video packs 42, which data amount is relatively large as shown in FIG. 1, one or a plurality of GOPs are recorded within one VOB unit 30. The audio data 43 and the sub picture data 44 are disposed intermittently between the video packs 42. These video data 42, audio data 43 and sub picture data 44 are not collectively recorded respectively, but are divided into a plurality of pieces and are recorded in each VOB unit 30 respectively.

It is prescribed by a standard specification of the DVD that there are 8 kinds of audio recordable on the DVD 1 while 32 kinds of sub picture recordable on the DVD 1.

These data are recorded such that the reproduction time corresponding to one VOB unit 30 (i.e. the reproduction time corresponding to the data recorded between one navi-pack 41 and another navi-pack 41 adjacent to said one navi-pack 41) is not shorter than 0.4 seconds.

Further, there always exists the navi-pack 41 in one VOBU 30 at the head thereof. On the other hand, there may not exist each of the video data 42, the audio data 43 and the sub picture data 44 in one VOBU 30, or, even in case that the packs P for these data exist in one VOBU 30, the number of the packs P and the order of the packs P are freely determined.

Here, a division of each of the video data 42, the audio data 43 and the sub picture data 44 as shown in FIG. 1, is called as a pack P. Namely, in one VOB unit 30, the video data 42, the audio data 43 and the sub picture data 44 are divided into packs P respectively and recorded, wherein the pack P in which the video data 42 is recorded is called as a video pack, the pack P in which the audio data 43 is recorded is called as an audio pack, and the pack P in which the sub picture data 44 is recorded is called as a sub picture pack. These packs P are record units set in correspondence with a packing process in the MPEG 2 method, which is employed at the time of recording the record information onto the DVD 1 in the present embodiment.

Further, a reading start time information, which is called as a SCR (System Clock Reference), a start code indicating a start of the pack P and the like are recorded at a pack header recorded at the head of each pack P. This SCR indicates a reading start time on a time axis of reproduction time, at which reading the data included in each pack P from the track buffer in the reproducing apparatus described later and inputting the read data into each buffer are to be started. On the other hand, as for each pack P, the video data 42, the audio data 43 or the sub picture data 44 is recorded in each packet, which is generally a record unit obtained by dividing the pack P more finely. In the DVD 1 of the present embodiment, one pack P consists of one packet PT in general.

Finally, the navi-pack 41 is provided with: a DSI (Data Search Information) data 51 in a packet PT including search information to search a video image or an audio sound desired to be displayed or sound-outputted (concretely, search information such as an address, where the video or audio to be displayed or sound-outputted is recorded, on the DVD 1); and a PCI (Presentation Control Information) data 50 in a packet PT including information related to a display control at a time of displaying the video image or outputting the audio sound, which is searched on the basis of the information of the DSI data 51. Here, the DSI data 51 and the PCI data 50 construct, as the packets, a DSI packet and a PCI packet respectively, and then are recorded. Further, all video data 42 included in one VOBU 30 consist of at least one GOP (Group Of Pictures) each having an ID number.

In the PCI data 50, high light information, which defines a display or operation at a time when one selection item is selected out of selection items by the audience, is included. By the high light information, for example, the change of the picture plane display for a selection item as well as the display position to be changed in correspondence with the selection item, on a special picture plane of selection items (i.e. a so-called menu picture plane) for the audience to select, and the command corresponding to the selected item (i.e. a command to be performed in correspondence with the selected item) are set.

Further, the video information to construct and display a frame, a selection button and the like, which is required to construct and display the menu picture plane, is recorded in the sub picture data 44 as the sub picture information.

On the other hand, the above described GOP is a minimum picture unit, which can be independently reproduced and which is determined by a standard based on the MPEG (Moving Picture Experts Group) 2 method. The MPEG 2 method is a picture compression method adopted at a time of recording the video information onto the DVD 1 in the present embodiment.

Here, the outline of the MPEG 2 method is explained. Namely, in general, frame pictures forward and backward of one frame picture in continuous frame pictures are often resembled to each other and have mutual relationships. The MPEG 2 method is a method, which is proposed by paying an attention to this fact, and which generates one frame picture existing between a plurality of frame pictures on the basis of the plurality of frame pictures transferred while they are timely separated by a few or several frames from each other, by means of an interpolating calculation based on moving vectors etc. of the original picture. In this case, if this one frame picture is to be recorded, it is enough to just record the information as for a differential vector and a moving vector thereof with respect to the plurality of frame pictures, so as to reproduce this one frame picture by estimating it from the plurality of frame pictures with referring to these vectors, at a time of reproduction. By this, the compression recording is enabled with respect to the picture.

Figure 2:
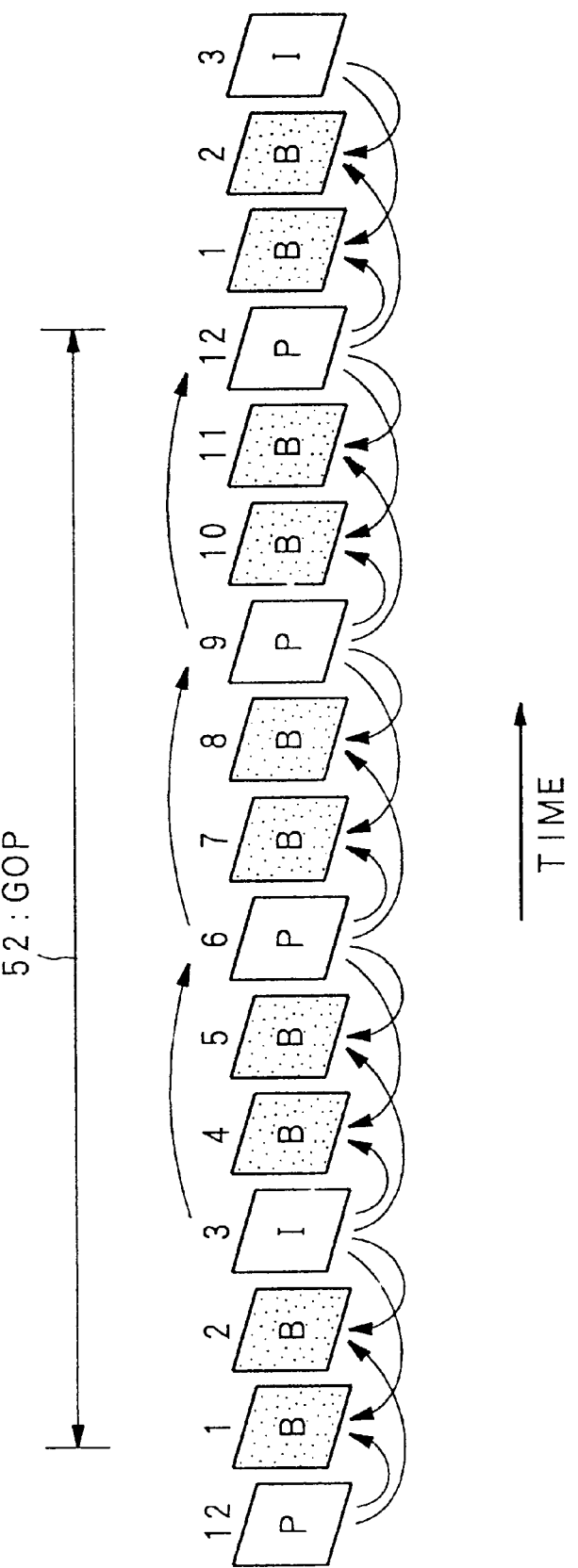
FIG. 2 is a diagram showing frame pictures constructing a GOP.

Further, the scheme of the above explained GOP is explained with reference to FIG. 2. FIG. 2 shows an example of a plurality of frame pictures constituting one GOP. In FIG. 2, a case where one GOP 52 consists of 12 frame pictures is illustrated (in the MPEG 2 method, the number of the frame pictures included in one GOP 52 is not fixed), for example. Among those frame pictures, a frame picture indicated by a reference sign "I" is called as an I picture (Intra-coded picture), which is defined as a frame picture able to be reproduced as a complete frame picture by use of its own picture information. A frame picture indicated by a reference sign "P" is called as a P picture (Predictive-coded picture), which is defined as a frame picture predicted or generated by decoding a difference from a predictive picture compensated and reproduced on the basis of the already decoded I picture or other picture. A frame picture indicated by a reference sign "B" is called as a B picture (Bidirectionally Predictive-coded picture), which is defined as a frame picture predicted or reproduced by use of not only the already decoded I picture or P picture but also the I picture or P picture which is recorded on the optical disk timely in the future relative to the pertinent B picture. In FIG. 2, the relationship in the prediction (i.e. the relationship in the compensation) between the respective pictures are indicated by arrows.

The MPEG 2 method used in the DVD 1 of the present embodiment employs a variable rate method, in which the data amount included in each GOP is not constant. Namely, in case that the respective pictures included in one GOP 52 correspond to a moving picture, which moving speed is rather fast and that the mutual relationship between the respective pictures is relatively small, the data amount constituting the respective pictures is increased, so that the data amount included in one GOP 52 is also increased. On the other hand, in case that the respective pictures included in one GOP 52 correspond to a moving picture which moving speed is rather slow and that the mutual relationship between the respective pictures is relatively large, the data amount constituting the respective pictures is decreased, so that the data amount included in one GOP 52 is also decreased.

In the above explained record format having a hierarchical structure as shown in FIG. 1, each division can be freely set according to the author's intention, so as to perform recording on the basis of these set divisions. By performing the reproduction on the basis of a later described logical structure for each of these divisions, the variegated reproduction can be performed.

Nextly, a logical format (logical structure) constructed by combining the information recorded by the physical divisions shown in FIG. 1 is explained with reference to FIG. 3. The information is not actually recorded on the DVD 1 in the logical structure of FIG. 3. Instead, information (e.g. access information or time information) to reproduce each data shown in FIGS. 1 to 3 by combining them (especially combining the cells 20) in the logical structure shown in FIG. 3, is recorded on the DVD 1, especially in the control data 11.

Figure 3:
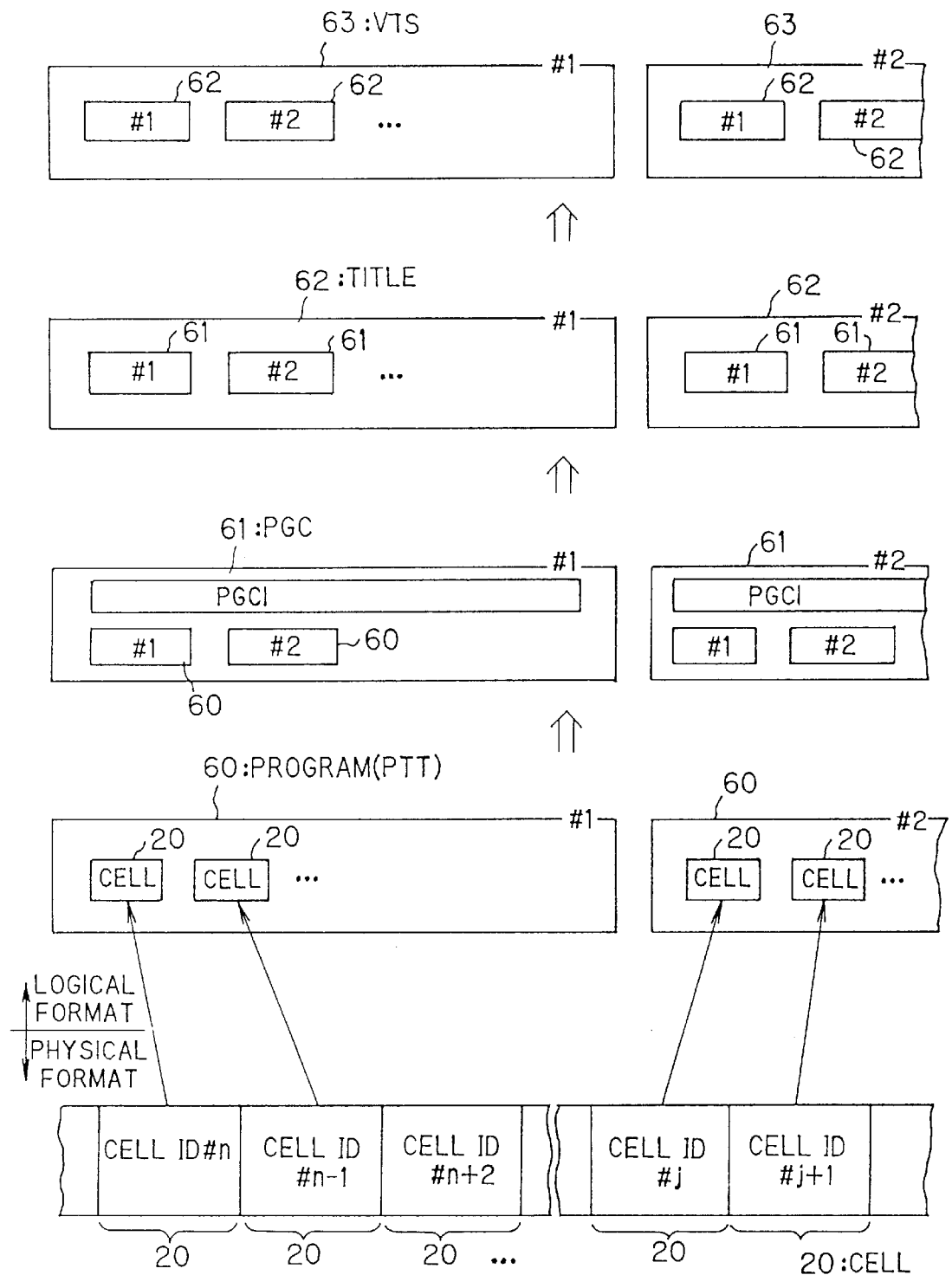
FIG. 3 is a diagram showing a logical structure of the record information of the DVD in FIG. 1.

To make the explanation clear, the following explanation is made from the lower hierarchical layer in FIG. 3. One program 60 is logically constructed on the basis of the author's intention by selecting and combining a plurality of cells 20 among the physical structures explained by use of FIG. 1. The program 60 is also a minimum logical unit, which division can be identified by a system controller of a reproducing apparatus described later and which can be accessed by use of a command by the system controller. It is also possible for the author to define a gathering of one or more programs 60 as a minimum unit, which can be freely selected to be watched or listened to by the audience and which is referred to as a PTT (ParT of Title).

Since one program 60 is logically constructed by selecting a plurality of cells 20, it is possible to use one cell commonly for a plurality of programs 60, namely to perform a so-called "alternative usage" of the cell 20 in which one cell 20 is reproduced in a plurality of different programs 60.

Here, as for the number of each cell 20, at a time of treating the cell 20 on the physical format shown in FIG. 1, the number is treated as the cell ID number (which is indicated by cell ID # in FIG. 1). On the other hand, at a time of treating the cell 20 on the logical format shown in FIG. 3, the number is treated as the cell number in the order of description in the PGCI described later.

Next, by combining a plurality of programs 60, one PGC (Program Chain) 61 is logically constructed on the basis of the author's intention. The aforementioned PGCI (ProGram Chain Information) is defined by a unit of the PGC 61. The PGCI includes information indicating: the reproduction order for each program 60 at a time of reproducing each program 60 (by this reproduction order, a unique program number (#1, #2, . . . ) is assigned to each program 60); the reproduction order for each cell 20 (by this reproduction order, a unique cell number is assigned to each cell 20); an address which is a record position of each cell 20 on the DVD 1; the number of the cell 20 positioned at the head of one program 60 to be firstly reproduced; a reproduction method for each program 60 [it is possible for the author to select one reproduction method out of (i) a random reproduction (which is a random reproduction by use of random numbers, and the same program 60 may be reproduced by a plurality of times), (ii) a shuffle reproduction (which is a random reproduction by use of random numbers in the same manner as the random reproduction, but one program 60 is reproduced just once but not reproduced by a plurality of times), (iii) a loop reproduction (which is a reproduction to reproduce one PGC 61 repeatedly), and (iv) a combination of the loop reproduction with the random reproduction or the shuffle reproduction, as a reproduction method to be employed at a time of reproduction]; still picture reproduction control information described later in detail, which is the feature of the present invention; and various commands (e.g. commands able to be specified by the author for each PGC 61 or each cell 20). The recording position of the PGCI on the DVD 1 may be in the control data 11 as aforementioned, or in a control data (not illustrated) in the video manager 2 if the pertinent PGCI is related to the menu in the video manager 2 (refer to FIG. 1).

In one PGC 61, the substantial video and audio data etc. are included as a combination of the programs 60 (in other words, the combination of the cells 20) other than the above mentioned PGCI.

Further, in one PGC 61, it is possible to perform the alternative usage of the cell 20 as explained before in the explanation for the program 60 (i.e. such a usage that the same cell 20 is commonly used by a plurality of different PGC 61). As the method of reproducing the cell 20 to be used, the author can select a method of reproducing the cells 20 in an order regardless of the recording order on the DVD 1 (i.e. the method of reproducing the cells discontinuously arranged, for example, the method of reproducing the cell 20 prior which is recorded posterior on the record track) other than a method of reproducing the cell 20 in the recording order on the record track on the DVD 1 as it is (i.e. the method of reproducing the cells continuously arranged).

Then, one title 62 is logically constructed of one or a plurality of PGCs 61 (PGC #1, PGC#2, . . . ) as shown in FIG. 3. The title 62 is, for example, a unit corresponding to one movie, and is completed information which the author would like to offer to the audience of the DVD 1.

Finally, one VTS 63 is logically constructed of one or a plurality of titles 62 (title #1, title #2, . . . ) as shown in FIG. 3. The title 62 included in the VTS 63 has the attributes common to each other. For example, the movies based on one movie but in different languages correspond to the respective titles 62. The information included in one VTS 63 shown in FIG. 3 corresponds to information included in one VTS 3 shown in FIG. 1. Namely, all information included in the logical VTS 63 shown in FIG. 4 is recorded as one VTS 3 in the DVD 1 shown in FIG. 1.

As the author specifies the information divided in the physical structure on the DVD 1 on the basis of the above described logical format, the video image (e.g. the movie image) for the audience to watch is to be formed.

The structure of the PGCI 64, in which the above mentioned still picture reproduction control information is included, is explained with reference to FIGS. 4 and 5.

Figure 4:
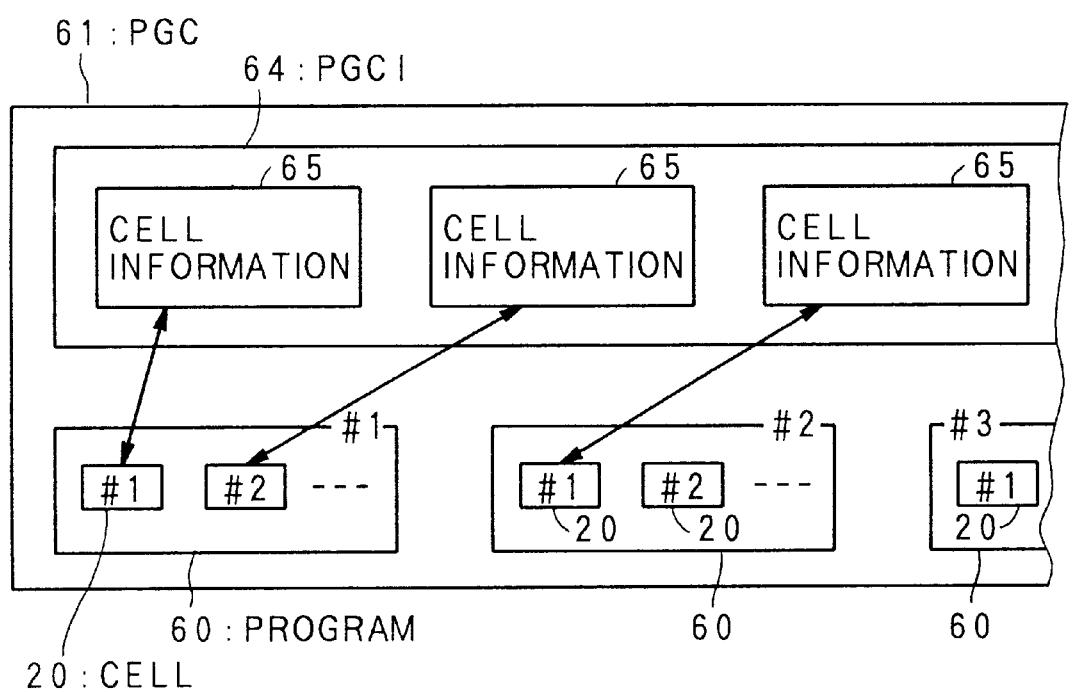
FIG. 4 is a diagram showing a detailed structure of PGCI in the embodiment.

As shown in FIG. 4, the PGCI 64 contains cell information 65 to control the reproduction of each cell 20 included in the program 60 corresponding to each control information contained in the pertinent PGCI 64, by a number corresponding to the number of the cells 20 included in the PGC 61. Then, each cell information 65 has the above mentioned still picture reproduction information to, after reproducing the cell 20 by a unit of the cell 20, perform a still picture reproduction of the picture at a final frame of the cell 20, at a time of reproduction. This still picture reproduction information is actually described in the cell information 65 for each cell 20. When they are integrated for each PGC 61, each of them is as shown in FIG. 5.

Figure 5:
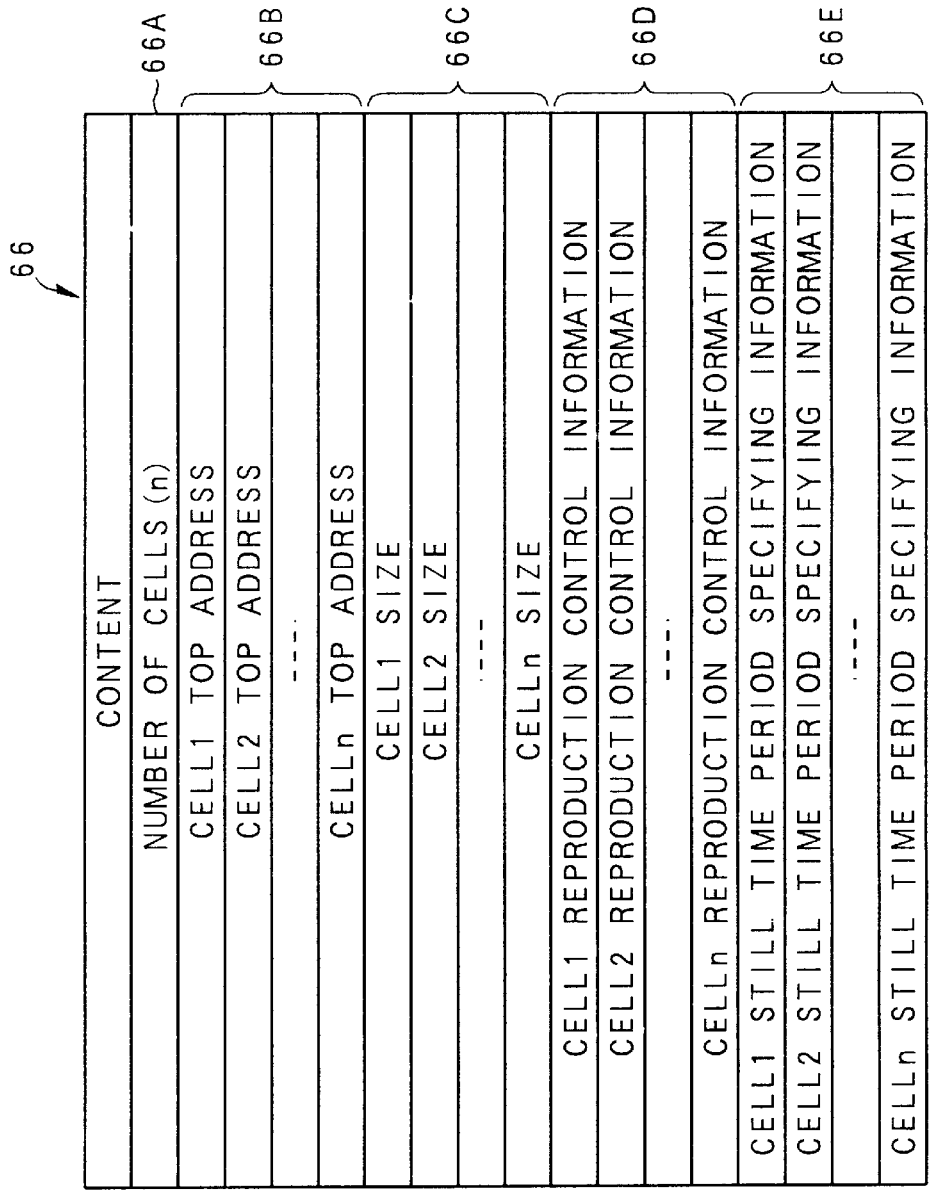
FIG. 5 is a diagram showing a data structure of still picture reproduction information in the embodiment.

That is, as shown in FIG. 5, still picture reproduction information 66 corresponding to one PGC 61 comprises: cell number data 66A indicative of the number (n) of the cells 20, which are logically included in the pertinent PGC 61; cell top address data 66B indicative of a top address on the DVD 1 at which each cell 20 is recorded; cell size data 66C for each cell 20 indicative of the size of each cell 20 (i.e., the data amount included in each cell 20); cell reproduction control information data 66D for each cell 20, which indicates whether the reproduction of the video or audio information included in each cell 20 is continuously performed or is automatically moved to the still picture reproduction by the unit of GOP 52 constituting each cell 20, at the time of reproduction; and still time period specifying information data 66E for each cell 20 indicative of a time period or duration of the still picture reproduction at the final picture after reproducing the video or audio information included in each cell 20.

Each cell reproduction control information data 66D among them comprises a flag of one bit for example, and is information to indicate whether the reproduction is continuously performed within the corresponding cell 20, or is temporarily stopped for each GOP 52 constituting the pertinent cell 20 so as to perform the still picture reproduction for each pertinent GOP 52. The meanings of the flags are, for example, as follows.

Flag [0]: The reproduction is continuously performed within the corresponding cell 20.

Flag [1]: the reproduction is temporarily stopped or interrupted for each GOP 52 included in the corresponding cell 20, so as to perform the still picture reproduction.

Incidentally, the time period or duration during which the still picture reproduction is to be performed is not specified in case of the flag [1]. Then, the still picture reproduction is continued until the audience inputs a cancel signal for interrupting the temporal stop (still picture reproduction). In case of the flag [1], it is possible to define for each VOB unit 30 to perform the still picture reproduction.

Next, the still time period specifying information data 66E comprises, for example, one byte information, and describes, in order to temporarily stop a final picture at a time when the reproduction for the corresponding cell 20 is finished and then to perform the still picture reproduction for a constant time until a next reproduced cell 20 is reproduced, a value of this constant time. More actually, for example, it describes the information defined as below.

(i) Still time period specifying information [0]:

After the corresponding cell 20 is reproduced, the still picture reproduction is not performed.

(ii) Still time period specifying information [1] to [254]:

After the corresponding cell 20 is reproduced, the still picture reproduction is performed for a period of (reproduction time specifying information)×1 (second), so that the still picture reproduction for the final picture is performed for the appropriate time.

(iii) Still time period specifying information [255]:

The still picture reproduction is performed without the specified time (until the cancel signal is inputted to interrupt the still picture reproduction), so that the still picture reproduction for the final picture is performed (so-called "infinite" still picture reproduction).

As defined in the above manner, in the cell 20 indicated by the still time period specifying information [0], the final picture thereof is reproduced as a dynamic picture. On the other hand, in the cell 20 indicated by the still time period specifying information [1] to [255], the final picture thereof is reproduced as the still picture.

The above explained still picture reproduction information 66 is recorded within the PGCI 64, which is located at a position different from the substantial portion of the video information and the audio information. Thus, an operation of an information reproducing apparatus described later, on the basis of the cell reproduction control information data 66D and the still time period specifying information data 66E, enables the still picture reproduction at any position according to the author's intention.

The still picture reproduction information 66 shown in FIG. 5 can describe only one still picture reproduction information 66 for one cell 20, and can describe a plurality of still picture reproduction informations 66 for one cell 20 as well. In this case, the information reproducing apparatus described later can implement plural types of still picture reproductions for one cell 20.

In the explanations for the physical structure shown in FIG. 1, for the easy understanding of the content, it has been explained such that a plurality of cells 20 are recorded in the order of the ID numbers. However, in the DVD 1 of the present embodiment, one cell 20 may be divided into a plurality of interleaved units IU to be actually recorded on the DVD 1, as shown in FIG. 6.

Figure 6:
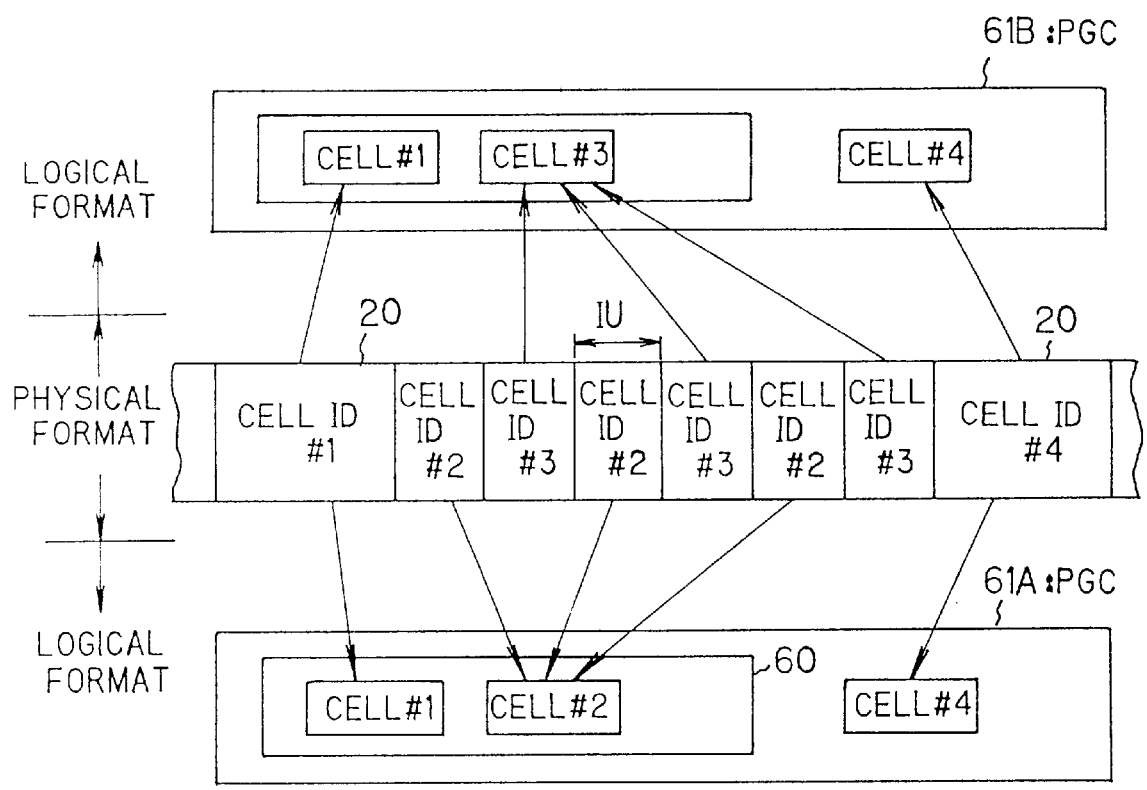
FIG. 6 is a diagram showing a structure of an interleaved unit of the DVD in FIG. 1.

Namely, as shown in FIG. 6, it is assumed that the author constructs one PGC 61A of the cells 20 having the ID numbers 1, 2 and 4, and constructs another PGC 61B of the cells 20 having the ID numbers 1, 3 and 4. In this case, at a time of reproducing the information from the DVD 1 on the basis of the PGC 61A, only the cells having the ID numbers 1, 2 and 4 are reproduced, while, at a time of reproducing the information from the DVD 1 on the basis of the PGC 61B, only the cells 20 having the ID numbers 1, 3 and 4 are reproduced. In the case of the PGC 61A for example, if the cells 20 are recorded spaced from each other for each ID number, a certain time period to jump the optical pickup from the record position of the cell 20 having the ID number 2 on the DVD 1 to the record position of the cell 20 having the ID number 4 on the DVD 1 is required in the reproduction. This results in that the continuous reproduction (hereinafter, it is referred to as a "seamless reproduction") of the cell 20 having the ID number 2 and the cell 20 having the ID number 4 may not be possible depending on a capacity of a track buffer of the reproducing apparatus described later.

Therefore, in the case shown in FIG. 6, the cell 20 having the ID number 2 and the cell having the ID number 3 are divided into interleaved units IU and are recorded by the interleaved units IU, each having a length, which does not destroy the continuity of an output signal of the track buffer even if an input signal to the track buffer is temporarily stopped, in correspondence with an input and output processing speeds at a track buffer of the reproducing apparatus described later (i.e. the interleaved units IU, each having a length which allows the track buffer to continuously output the output signal even if the input signal to the track buffer is ceased while the optical pickup jumps for the interval of one interleaved unit IU). For example, in case of reproduction based on the PGC 61A, only the interleaved units IU constructing the cell 20 corresponding to the ID number 2 are continuously detected to be reproduced. In the same manner, in case of reproduction based on the PGC 61B, only the interleaved units IU constructing the cell 20 corresponding to the ID number 3 are continuously detected to be reproduced. The length of the interleaved unit IU may be determined with considering the capability of a driving mechanism such as a slider motor to perform the track jump, in addition to the memory capacity of the track buffer.

In this manner, by dividing one cell 20 into a plurality of interleaved units IU and recording them according to the author's intention, the signal outputted from the track buffer can be continuous even at a time of reproducing the PGC 61 including the cells 20 having the discontinuous ID numbers, so that it is possible for the audience to watch continuous reproduction video image.

Each interleaved unit IU is completed in one VOB 10, and does not stride over two adjacent VOBs 10. As for the relationship between the interleaved unit IU and the VOB unit 30, one or a plurality of VOB units 30 are included in one interleaved unit IU. One VOB unit 30 is completed in one interleaved unit IU, and is not divided into a plurality of interleaved units IU or does not strides over a plurality of interleaved units IU.

Since it is necessary to record the information at various hierarchy classes explained above, the record information having the above explained recording format is suitable for an information record medium having a large memory capacity, such as the aforementioned DVD 1, which memory capacity is so large that audio voices or subtitles in various kinds of languages in addition to the movie itself can be recorded on a single optical disk as for the audio voice or subtitle of the movie.

(II) Embodiment of Recording Apparatus

Next, an embodiment of recording apparatus for recording the above mentioned control information, video information and audio information onto the DVD 1 will be explained with reference to FIG. 7.

At first, a construction and an operation of the recording apparatus as the embodiment is explained with reference to FIG. 7.

Figure 7:
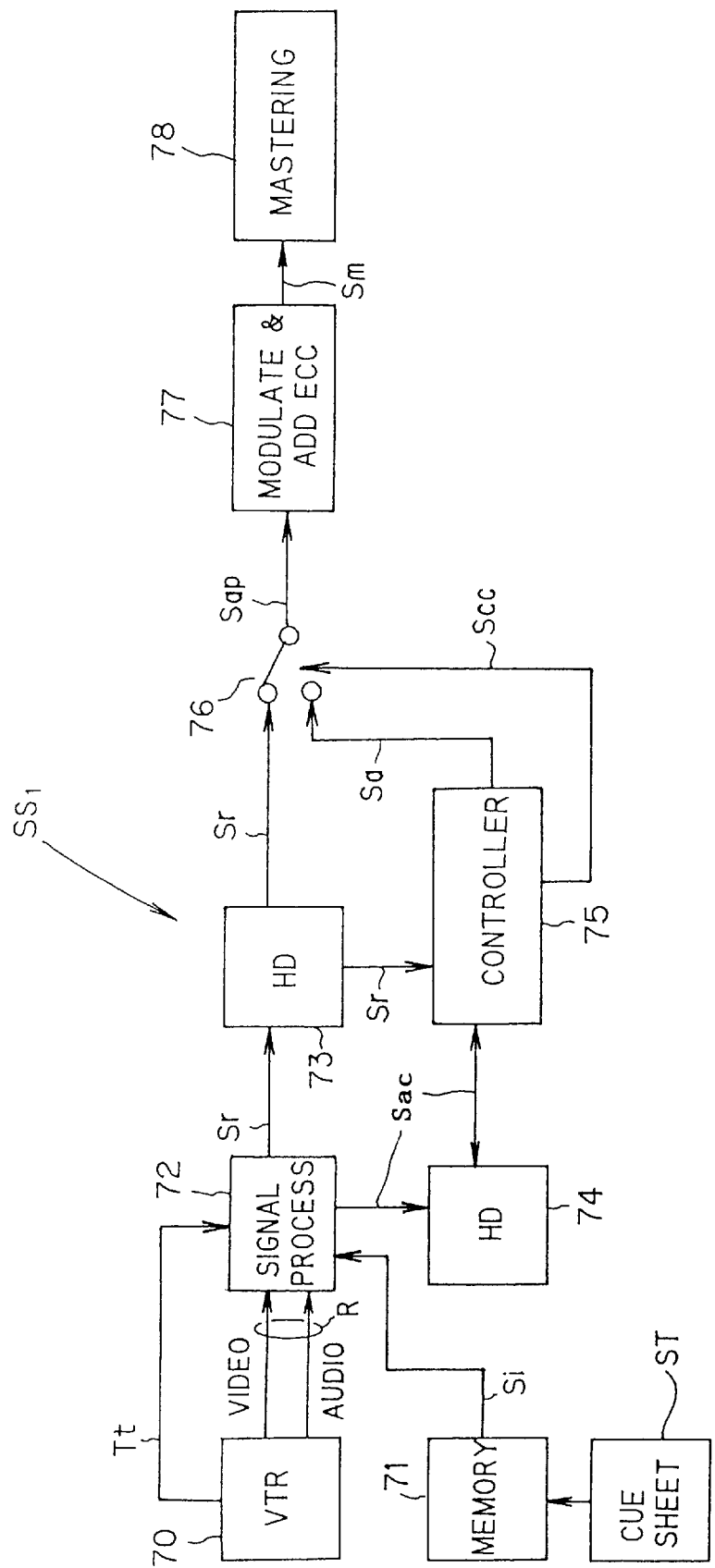
FIG. 7 is a block diagram of an information recording apparatus as one embodiment of the present invention.

As shown in FIG. 7, a recording apparatus SS1 as the present embodiment is provided with: a VTR (Video Tape Recorder) 70; a memory 71; a signal process unit 71; a hard disk (HD) device 73; a hard disk (HD) device 74; a controller 75; a multiplexer 76; a modulator 77; and a mastering device 78.

Nextly, an operation of the present embodiment is explained.

Record information R, which is a raw material such as audio information, video information etc. to be recorded on the DVD 1 (which includes the above mentioned video data 42, sub picture data 44 and audio data 43), is temporarily recorded in the VTR 70. Then, the record information R temporarily record in the VTR 70 is outputted to the signal process unit 72 by a request from the signal process unit 72.

The signal process unit 72 applies an A/D (Analog to Digital) converting process and a signal compressing process by the MPEG 2 method to the record information R outputted from the VTR 70, and time-axis-multiplexes the audio information and the video information to output it as a compressed multiplexed signal Sr. After that, the compressed multiplexed signal Sr outputted therefrom is temporarily stored into the hard disk device 73.

Along with this, the memory 71 classifies the record information R into a plurality of information units such as the cell 20, the VOB unit 30 and so on, on the physical structure shown in FIG. 1, in advance, and temporarily stores various control informations which are inputted beforehand on the basis of a cue sheet ST, on which additional informations, such as various control informations including the still picture reproduction information 66 shown in FIG. 5 for each of the information units (e.g. the video manager 2, the control data 11 including the PGCI 64, the navi-pack 41 (the PCI data 50 and the DSI data 51) and so on, in FIG. 1) are written. Then, the memory 71 outputs it as a control information signal Si on the basis of a request from the signal process unit 72.

Then, the signal process unit 72 generates and outputs a reproduction control information signal Sac, which includes the control data 11 corresponding to each information unit with referring to a time code Tt, on the basis of the time code Tt corresponding to the record information R outputted from the VTR 70 and the control information signal Si outputted from the memory 71. Then, the reproduction control information signal Sac is temporarily stored in the hard disk device 74. At this time, although illustrations of the control informations stored in the memory 71 other than the control data 11 are omitted in FIG. 7, they are generated in the signal process unit 72, and are stored in the hard disk device 74, in the same manner as the control data 11.

The above described processes are performed with respect to the whole record information R.

When the above described processes are finished as for the whole record information R, the controller 75 reads out the compressed multiplexed signal Sr from the hard disk device 73, reads out the reproduction control information signal Sac from the hard disk device 74, generates the control information again on the basis of these read out signals, and stores it into the hard disk device 74. This is because there may be a control signal, which content is determined in dependence upon a generation result of the compressed multiplexed signal Sr among various control signals.

On the other hand, the controller 75 performs a time management for each of the operations of the signal process unit 72, the hard disk device 73 and the hard disk device 74, and reads out the reproduction control information signal Sac including the control data 11, from the hard disk device 74, so that the controller 75 generates and outputs an additional information signal Sa corresponding to the read out reproduction control information signal Sac, and generates and outputs an information selection signal Scc to time-axis-multiplex the compressed multiplexed signal Sr and the additional information signal Sa.

After that, the compressed multiplexed signal Sr (which respectively includes the video data 42, the sub picture data 44 and the audio data 43 for each stream) and the additional information signal Sa are time-axis-multiplexed by the multiplexer 76 to be outputted as an information added compressed multiplexed signal Sap. At the stage of this information added compressed multiplexed signal Sap, the record information R has the physical structure shown in FIG. 1, and the still picture reproduction information 66 is included in the corresponding PGCI 64. Further, the control data 11 including this PGCI 64 is multiplexed such that it is recorded at the inner circumferential side of the recording position on the DVD 1 where the VOB 10 is recorded for each VTS 3.

If there exists the sub picture information to be recorded, it is inputted, by other means such as a hard disk device not illustrated, to the signal process unit 72, so that it is processed in the same manner as the video and audio information thereat.

Then, the modulator 77 adds an error correction code (ECC), such as a Reed Solomon code, and applies a modulation such as an eight to sixteen (8–16) modulation with respect to the information added compressed multiplexed signal Sap outputted from the multiplexer 76, and generates and outputs a disk record signal Sm to the mastering device 78.

Finally, the mastering device 78 records the disk record signal Sm to a stamper disk, which becomes a master (i.e. a cutting dye) for the production of an optical disk. Then, by use of this stamper disk, an optical disk as a replica disk, which can be on sale in the general market, i.e. the DVD 1, can be produced by a replication device not illustrated.

According to the above explained recording apparatus SS1, the still picture reproduction information 66 to control the still picture reproduction for each cell 20 or GOP 52 is recorded on the PGCI 64. Thus, by performing the still picture reproduction of the final picture of the cell 20 on the basis of the still picture reproduction information 66 at a time of reproducing the record information R, it is possible to reproduce the final picture included in the cell 20 as the still picture as well as the dynamic or moving picture. And that, it is also possible to perform the still picture reproduction in which the time period of the still picture reproduction can be changed for each cell 20.

Moreover, the still time period specifying information data 66E contains both of the still time period specifying information, in which the still time period is specified, and the still time period specifying information, in which the still time period is not specified. Thus, by controlling the reproduction on the basis of each still time period specifying information data 66E, it is possible to perform the still picture reproduction in which the time period is specified, and also possible to continue the still picture reproduction until the stop of the still picture reproduction is specified by the audience.

Further, since the still picture reproduction information 66 also contains the cell reproduction control information data 66D, it is possible to perform the still picture reproduction for each GOP 52 at a time of reproducing the record information R.

Furthermore, the multiplexer 76 multiplexes the compressed multiplex signal Sr and the still picture reproduction information 66, so as to record the still picture reproduction information 66 at a recording position on the DVD 1, which is different from the recording position where the record information R is recorded and which is reproduced prior to the reproduction of the record information R, namely at the inner circumferential side of the DVD. As a result, it is possible to collectively obtain the cell reproduction control information data 66D or the still time period specifying information data 66E contained in the still picture reproduction information 66 before reproducing the record information R.

Further, in case that a plurality of still picture reproduction informations 66 are defined for one cell 20, it is possible to implement a plurality types of still picture reproductions for one cell 20, in the information reproducing apparatus as described later.

(III) Embodiment of Reproducing Apparatus

Next, an embodiment of reproducing apparatus for reproducing the information recorded on the DVD 1 by the above mentioned recording apparatus SS1 will be explained with reference to FIGS. 8 to 11.

At first, a construction and an operation of the reproducing apparatus as the embodiment is explained with reference to FIG. 8.

Figure 8:
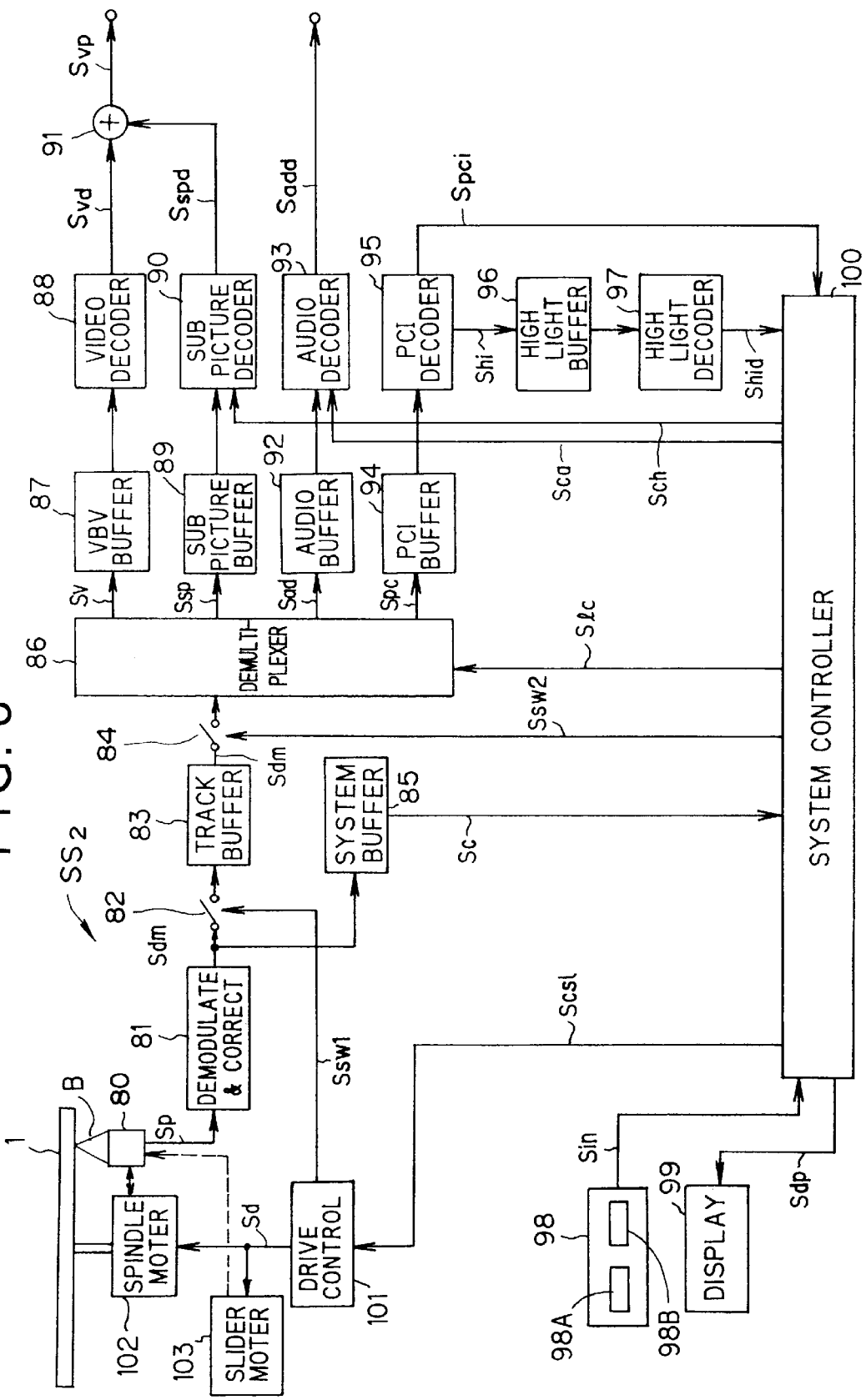
FIG. 8 is a block diagram of an information reproducing apparatus as another embodiment of the present invention.

As shown in FIG. 8, a reproducing apparatus SS2 as the present embodiment is provided with: an optical pickup 80; a demodulate and correct unit 81; stream switches 82 and 84; a track buffer 83; a system buffer 85; a demultiplexer 86; a VBV (Video Buffer Verifier) buffer 87; a video decoder 88; a sub picture buffer 89; a sub picture decoder 90; a mixer 91; an audio buffer 92; an audio decoder 93; a PCI (Presentation Control Information) buffer 94; a PCI decoder 95; a high light buffer 96; a high light decoder 97; an input unit 98; a display unit 99; a system controller 100; a drive controller 101; a spindle motor 102; and a slider motor 103. The construction shown in FIG. 8 only illustrates the portions related to the video and audio reproduction of the reproducing apparatus SS2. The description and the detailed explanation as for servo circuits to servo-control the optical pickup 80, the spindle motor 102, the slider motor 103 and the like are omitted since they are constructed in the same manner as the conventional arts.

The input unit 98 is provided with: a still key 98A to perform a so-called still reproduction (i.e., such a reproduction that one picture in the dynamic or moving pictures, which is being reproduced, is temporarily stopped and is still-picture-reproduced); and a pause key 98B to perform a so-called pause reproduction (i.e., such a reproduction that the reproduction itself is temporarily stopped, and the picture is not displayed (more concretely, the video signal Svp is not outputted to the display section which is not illustrated)).

Nextly, an overall operation of the present embodiment is explained.

The optical pickup 80 includes a laser diode, a polarization beam splitter, an objective lens, a photo-detector and the like not illustrated, and irradiates a light beam B as a reproduction light with respect to the DVD 1. The optical pickup 80 receives a reflection light of the light beam B from the DVD 1, and outputs a detection signal Sp corresponding to information pits formed on the DVD 1. At this time, the tracking servo control and the focus servo control are operated with respect to the objective lens etc. of the optical pickup 80 in the same manner as the conventional art so that the light beam B can be irradiated precisely onto the information track of the DVD 1 and that the light beam B can be focused on the information record surface of the DVD 1.

The detection signal Sp outputted from the optical pickup 80 is inputted to the demodulate and correct unit 81, where a signal demodulation process and an error correct process are applied to it to generate a demodulation signal Sdm, which is outputted to the stream switch 82 and the system buffer 85.

The opening and closing operation of the stream switch 82, to which the demodulation signal Sdm is inputted, is controlled by a switch signal Ssw1 from the drive controller 101. When it is closed, the stream switch 82 passes therethrough the inputted demodulation signal Sdm as it is to the track buffer 83. When it is opened, the demodulation signal Sdm is not outputted therethrough, so that unnecessary or useless information (signal) is not inputted to the track buffer 83.

The track buffer 83, to which the demodulation signal Sdm is inputted, consists of a FIFO (First In First Out) memory, for example. The track buffer 83 temporarily stores the inputted demodulation signal Sdm, and continuously outputs the stored demodulation signal Sdm when the stream switch 84 is closed. The track buffer 83 compensates a difference or fluctuation in the data amount between respective GOP under the MPEG 2 method, and continuously outputs the demodulation signal Sdm, which is discontinuously inputted due to a track jump in the aforementioned seamless reproduction, in case of reading the data divided into the interleaved units IU, so as to avoid the interruption of the reproduction due to the discontinuity.

The opening and closing operation of the stream switch 84, to which the demodulation signal Sdm is continuously inputted, is controlled by a switch signal Ssw2 from the system controller 100 such that the various buffers at its posterior stage may not be over-flown or, on the contrary, may not become empty to stop the decoding process, in the separating process by the demultiplexer 86.

On the other hand, the system buffer 85, to which the demodulation signal Sdm is inputted in parallel with the track buffer 83, accumulates the management information related to the whole information recorded on the DVD 1 which is detected firstly upon loading the DVD 1, or the additional information such as the control information 11 including the still picture reproduction information 66 (refer to FIG. 5). Then, the system buffer 85 outputs the accumulated data as one portion of a control information Sc to the system controller 100, and temporarily stores the DSI data 51 for each navi-pack 41 (refer to FIG. 1) while reproducing the information, to output it as another portion of the control information Sc.

The demultiplexer 86, to which the demodulation signal Sdm is continuously inputted through the stream switch 84, separates the video data 42, the audio data 43, the sub picture data 44 and the PCI data 50 for each navi-pack 41 respectively from the inputted demodulation signal Sdm, and outputs them as a video signal Sv, a sub picture signal Ssp, an audio signal Sad and a PCI signal Spc respectively to the VBV buffer 87, the sub picture buffer 89, the audio buffer 92 and the PCI buffer 94. There may be a case where, in the demodulation signal Sdm, different streams of the audio data 43 or the sub picture data 44 in a plurality of different languages are included as the audio or sub picture information. In that case, a desirable language is selected for the audio or sub picture information by a stream selection signal Slc from the system controller 100, so that the audio or sub picture information in the desirable language is outputted to the audio buffer 92 or the sub picture buffer 89.

The VBV buffer 87, to which the video signal Sv is inputted, consists of a FIFO memory, for example. The VBV buffer 87 temporarily stores the video signal Sv and outputs it to the video decoder 88. The VBV buffer 87 compensates the difference or fluctuation in the data amount between respective pictures of the video signal Sv compressed by the MPEG 2 method (refer to FIG. 2). Then, the video signal Sv in which the differences in the data amount are compensated, is outputted to the video decoder 88, and is decoded by the MPEG 2 method to be outputted as a decoded video signal Svd to the mixer 91.

On the other hand, the sub picture buffer 89, to which the sub picture signal Ssp is inputted, temporarily stores the inputted sub picture signal Ssp, and outputs it to the sub picture decoder 90. The sub picture buffer 89 is to synchronize the sub picture data 44 included in the sub picture signal Ssp with the video data 42 corresponding to the sub picture data 44, and to output it. Then, the sub picture signal Ssp synchronized with the video data 42 is inputted to the sub picture decoder 90 and is decoded to be outputted as a decoded sub picture signal Sspd to the mixer 91.

In a case where the sub picture signal Ssp includes video information to construct a frame, a selection button etc. for displaying the menu picture plane, the sub picture decoder 90 changes a display condition of the selection button etc. to be displayed, in the sub picture signal Sspd on the basis of a high light control information Sch from the system controller 100 to output it.

The decoded video signal Svd outputted from the video decoder 88 and the decoded sub picture signal Sspd outputted from the sub picture decoder 90 (which is in synchronization with the corresponding decoded video signal Svd) are mixed together by the mixer 91, and are outputted as a final video signal Svp to be displayed to a display device such as a CRT (Cathode Ray Tube) device not illustrated.

The audio buffer 92, to which the audio signal Sad is inputted, consists of a FIFO memory, for example. The audio buffer 92 temporarily stores the audio signal Sad and outputs it to the audio decoder 93. The audio buffer 92 is to synchronize the audio signal Sad with the video signal Sv or the sub picture signal Ssp including the corresponding video information, and delays the audio signal Sad in accordance with the output condition of the corresponding video information. Then, the audio signal Sad, which is time-adjusted to synchronize with the corresponding video information (in the signal form as shown in the lower stage of FIG. 7 or FIG. 8), is outputted to the audio decoder 93. Then, a predetermined decoding process is applied thereat to the audio signal Sad, on the basis of the header control signal Shc outputted from the system controller 100, and it is outputted as a decoded audio signal Sadd to a speaker etc. not illustrated.

If it is detected by the system controller 100 that it is necessary to temporarily stop (pause) the audio voice in the reproduction immediately after accessing the desired information, a pause signal Sca is outputted from the system controller 100 to the audio decoder 93, so that the output of the decoded audio signal Sadd is stopped temporarily at the audio decoder 93.

The PCI buffer 94, to which the PCI signal Spc is inputted, consists of a FIFO memory, for example. The PCI buffer 94 temporarily stores the inputted PCI signal Spc and outputs it to the PCI decoder 95. The PCI buffer 94 is to synchronize the PCI data 50, which is included in the PCI signal Spc, with the video data 42, the audio data 43 and the sub picture data 44 corresponding to the PCI data 50, and apply the PCI data 50 to the video data 42, the audio data 43 and the sub picture data 44. Then, from the PCI signal Spc, which is synchronized with the corresponding the video data 42, the audio data 43 or the sub picture data 44 by the PCI buffer 94, high light information included in the PCI data 50 is separated or extracted by the PCI decoder 95, and is outputted as a high light signal Shi to the high light buffer 96. The portion of the PCI data 50 other than the high light information is outputted as a PCI information signal Spci to the system controller 100.

The high light buffer 96, to which the high light signal Shi is inputted, consists of a FIFO memory, for example. The high light buffer 96 temporarily stores the inputted high light signal Shi and outputs it to the high light decoder 97. The high light buffer 96 is to time-compensate the high light signal Shi so as to precisely perform a change in the display condition of the selection item, which corresponds to the high light information, in correspondence with the sub picture signal Ssp which includes the video information for the high light information. Then, the time-compensated high light signal Shi is decoded by the high light decoder 97, and the information included in the high light signal Shi is outputted as a decoded high light signal Shid to the system controller 100. The information to set the value of the register in the system controller 100 is included in this decoded high light signal Shid.

Here, the system controller 100 outputs the aforementioned high light control signal Sch to change the display condition by the high light information, on the basis of the decoded high light signal Shid.

Further, on the basis of the control information Sc inputted from the system buffer 85, the PCI information signal Spci inputted from the PCI decoder 95 and an input signal Sin inputted from the input unit 98 such as a remote controller, the system controller 100 outputs the aforementioned switch signal Ssw2, a stream selection signal (e.g. a language selection signal) Slc, the pause signal Sca and the high light control signal Sch to correctly perform the reproduction corresponding to those input signals, and also outputs a display signal Sdp to display an operation condition etc. of the reproducing apparatus SS2 to the display unit 99 such as the liquid crystal device. When the input signal Sin to instruct the execution of the still reproduction or the pause reproduction is inputted from the still key 98A or the pause key 98B of the input unit 98, the system controller 100 performs the respective operations as described later (refer to FIG. 10 or FIG. 11).

Furthermore, the system controller 100 outputs a seamless control signal Scs1 corresponding to the track jump process, to the drive controller 101, when it detects by the control signal Sc etc. that it is necessary to perform the track jump process such as a search in order to perform the seamless reproduction.

Then, the drive controller 101, to which the seamless control signal Scs1 is inputted, outputs a drive signal Sd to the spindle motor 102 or the slider motor 103. By this drive signal Sd, the spindle motor 102 or the slider motor 103 moves the optical pickup 80 such that the record position to be reproduced on the DVD 1 is irradiated with the light beam B (refer to an arrow of a broken line in FIG. 8), and the spindle motor 102 CLV-controls (Constant Linear Velocity-controls) the rotation number of the DVD 1. Along with this, the drive controller 101 outputs the aforementioned switch signal Ssw1 on the basis of the seamless control signal Scs1, so as to open the stream switch 82 when the demodulation signal Sdm is not outputted from the demodulate and correct unit 81 while the optical pickup 80 is being moved, and so as to close the stream switch 82 when the demodulation signal Sdm is started to be outputted, so that the demodulation signal Sdm is outputted to the track buffer 83.

Figure 9:
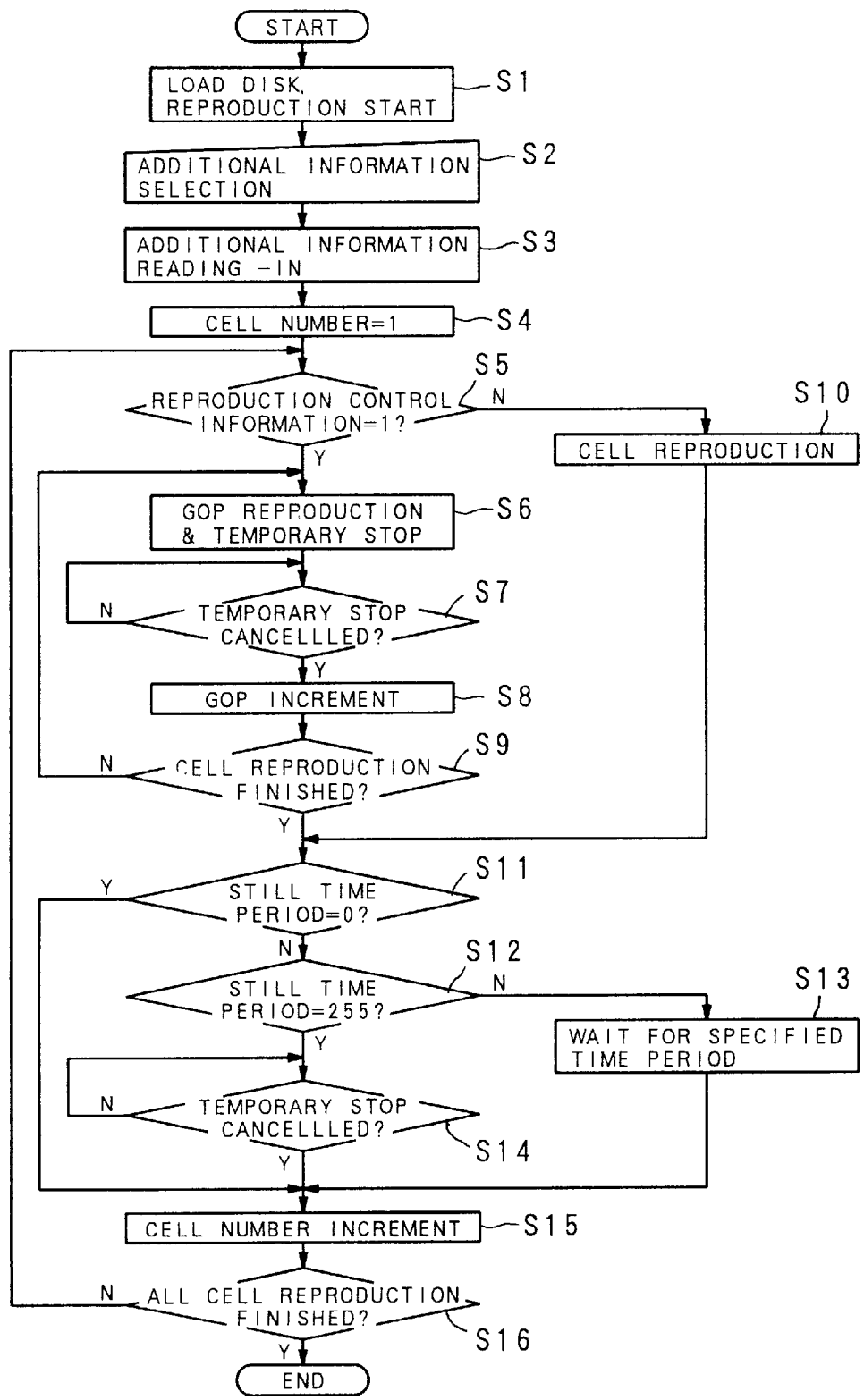
FIG. 9 is a flow chart of a still picture reproducing operation of the information reproducing apparatus of the embodiment.

Especially, an operation of the still picture reproduction in accordance with the present invention in the above mentioned reproducing apparatus SS2 is explained mainly as for a process in the system controller 100, with reference to a flow chart shown in FIG. 9.

As shown in FIG. 9, in the still picture reproducing operation using the still picture reproduction information 66 in the reproducing apparatus SS2 of this embodiment, when the DVD 1 is firstly loaded and the reproduction is started (Step S1), the audience selects VTS 3 to be reproduced from the initial menu and the like recorded on the video manger 2, so that the additional information including the control information, such as the still picture reproduction information 66 and the like, corresponding to the VTS 3 to be reproduced is selected (Step S2).

After that, the system controller 100 reads in the selected additional information through the system buffer 85 (Step S3). At this time, as mentioned above, when a plurality of still picture reproduction informations 66 are recorded for one cell 20, the still picture reproduction information 66 corresponding to the VTS 3 selected by the audience is automatically selected. At this time, in addition to the structure so as to automatically select the still picture reproduction information 66 corresponding to the VTS 3, such a configuration may be adopted that a menu picture plane and the like related to a plurality of still picture reproducing operations corresponding to a plurality of still picture reproduction informations 66 is displayed to the audience, so as to allow the audience to select one of them and to thereby select one still picture reproduction information 66.

When the additional information is read in at the step S3, a parameter indicative of the cell number of the cell 20 included in the selected VTS 3 (Step S2) is set to [1] (Step S4).

Then, the cell reproduction control information data 66D of the cell 20 corresponding to the read in still picture reproduction information 66 is detected, and it is judged whether or not it is [1] (Step S5).

In case that the cell reproduction control information data 66D of the cell 20 is [1] (Step S5; YES), it is determined that the temporarily stop is to be performed for each GOP 52 included in the cell 20 and the still picture reproduction is to be carried out. Thus, after the first GOP 52 is reproduced, the still picture reproduction is carried out (Step S6). And, it is judged whether or not the input signal Sin including the cancel signal to stop the still picture reproduction is inputted from the still key 98A or pause key 98B of the input unit 98 (Step S7). If not inputted (Step S7; NO), the still picture reproduction is continued as it is. If inputted (Step S7; YES), the GOP 52 is incremented by one (Step S8). Next, it is judged whether or not the reproduction of the whole cell 20 in which the reproduced GOP 52 is included is finished (Step S9). When the reproduction of the whole cell 20 is not finished (Step S9; NO), the flow returns back to the step S6 so as to perform the processes from the step S6 to step S9 for the incremented GOP 52.

In case that the cell reproduction control information data 66D of the cell 20 is not [1] by the judgment at the step S5 (Step S5; NO), it is determined that the still picture reproduction is not to be performed for each GOP 52, and the continuous reproduction is performed within the cell 20 as it is (Step S10). Then, the flow proceeds to a step S11.

On the other hand, when the reproduction of the whole cell 20 is finished (Step S9; YES) by the judgment at the step S9, the still time period specifying information data 66E within the still picture reproduction information 66 corresponding to the cell 20 of the cell number [1] is detected, and it is judged whether or not it is [0] (Step S11). In case that the still time period specifying information data 66E is [0] (Step S11; YES), it is determined that the still picture reproduction for the final picture is not to be performed at the cell 20. Then, the flow proceeds to at a step S15.

On the other hand, in case that the still time period specifying information data 66E is not [0] (Step S11; NO), it is next judged whether or not the still time period specifying information data 66E is [255] (Step S12). In case that the still time period specifying information data 66E is not [255] (Step S12; NO), it is determined that the cell 20 is to be reproduced only for the time period specified to the still time period specifying information data 66E, and then the final picture thereof is still-picture-reproduced. Thus, the still picture reproduction is performed only for the specified time period (Step S13). The flow proceeds to the step S15.

In case that the still time period specifying information data 66E is [255] in the judgment at the step S12 (Step S12; YES), it is judged whether or not the input signal Si including the cancel signal is inputted (Step S14), so as to continue the still picture reproduction of the final picture of the cell 20 until the input signal Sin including the cancel signal to stop the still picture reproduction is inputted from the input unit 98. If not inputted (Step S14; NO), the still picture reproduction of the final picture of the cell 20 is continued until inputted. When the input signal Sin including the cancel signal is inputted (Step S14; YES), the still picture reproduction is finished, and the parameter indicative of the cell number is incremented by [1] (Step S15). Then, it is judged whether or not the processes for all the cells 20 included in the still picture reproduction information 66 are finished (Step S16). If not finished (Step S16; NO), the flow returns back to the step S5 so as to repeat the processes on and after the step S5 for the cell 20 corresponding to the incremented cell number. When the processes for all the cells 20 are finished (Step S16; YES), the reproducing processes for the VTS 3 including these cells 20 are ended.

According to the operation using the still picture reproduction information 66 in the above mentioned reproducing apparatus SS2, the still picture reproduction information 66 to control the still picture reproduction for each cell 20 or GOP 52 is recorded on the PGCI 64. Thus, it is possible to perform the still picture reproduction in which the time period or duration of the still picture reproduction is changed for each cell 20, by still-picture-reproducing the final picture of the cell 20 according to the author's intention on the basis of the still picture reproduction information 66.

Moreover, the still time period specifying information data 66E contains: the still time period specifying information in which the still time period is specified; and the still time period specifying information in which the still time period is not specified. Thus, by controlling the reproduction on the basis of each still time period specifying information data 66E, it is possible to perform the still picture reproduction in which the time period is specified according to the author's intention, and also possible to continue the still picture reproduction until the stop of the still picture reproduction is specified by the audience.

Further, since the still picture reproduction information 66 further contains the cell reproduction control information data 66D, it is possible to perform the still picture reproduction for each GOP 52 at a time of reproducing the record information R.

Furthermore, since the still picture reproduction information 66 is recorded at the inner circumference of the DVD 1, it is possible to collectively obtain the cell reproduction control information data 66D or the still time period specifying information data 66E contained in the still picture reproduction information 66 in advance of reproducing the record information R. At this time, when there exist a plurality of still picture reproduction informations 66 for one cell 20, it is possible to select the still picture reproduction information 66 from them to thereby select and obtain the desired still picture reproduction information 66 or still time period specifying information data 66E, to thereby implement a plurality of still picture reproductions for one cell 20.

Figures 10A, 10B:
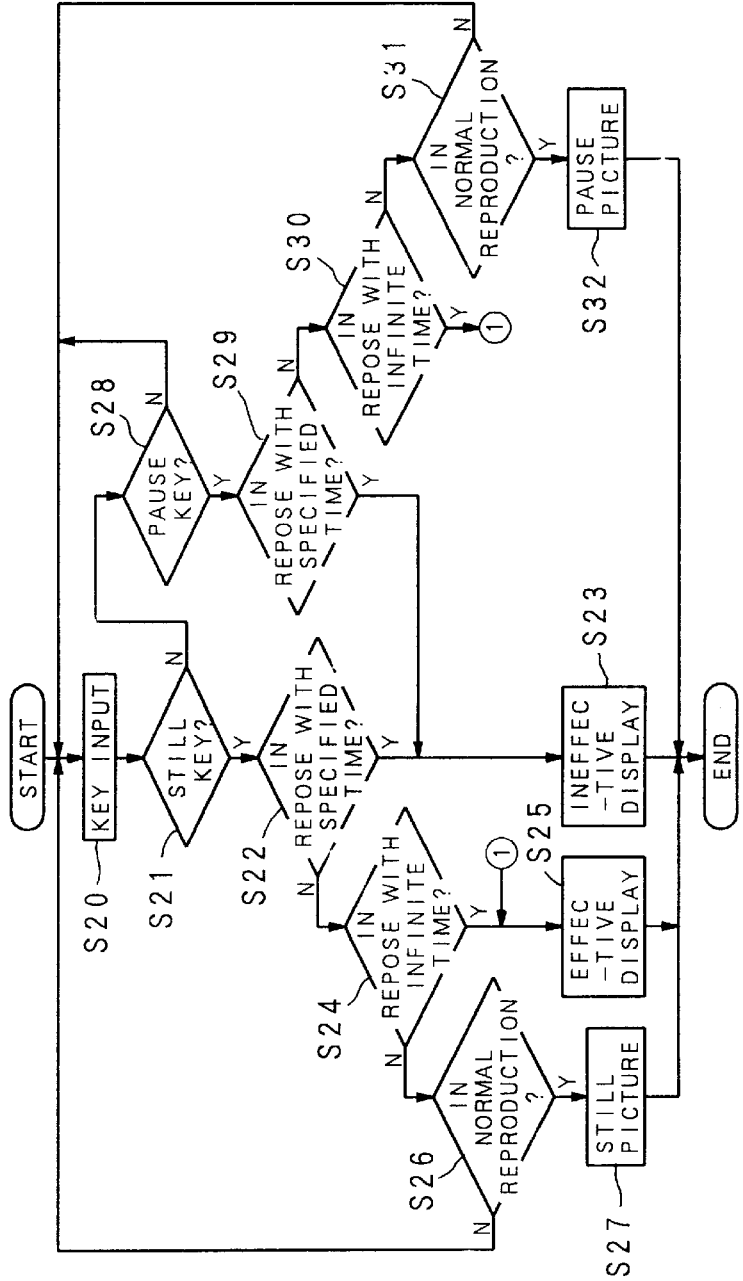
FIG. 10A is a table showing operations performed when a still key or pause key is operated in the information reproducing apparatus of the embodiment.
FIG. 10B is a flow chart showing an operation performed when the still key or pause key is operated in the information reproducing apparatus of the embodiment.
Figure 11:
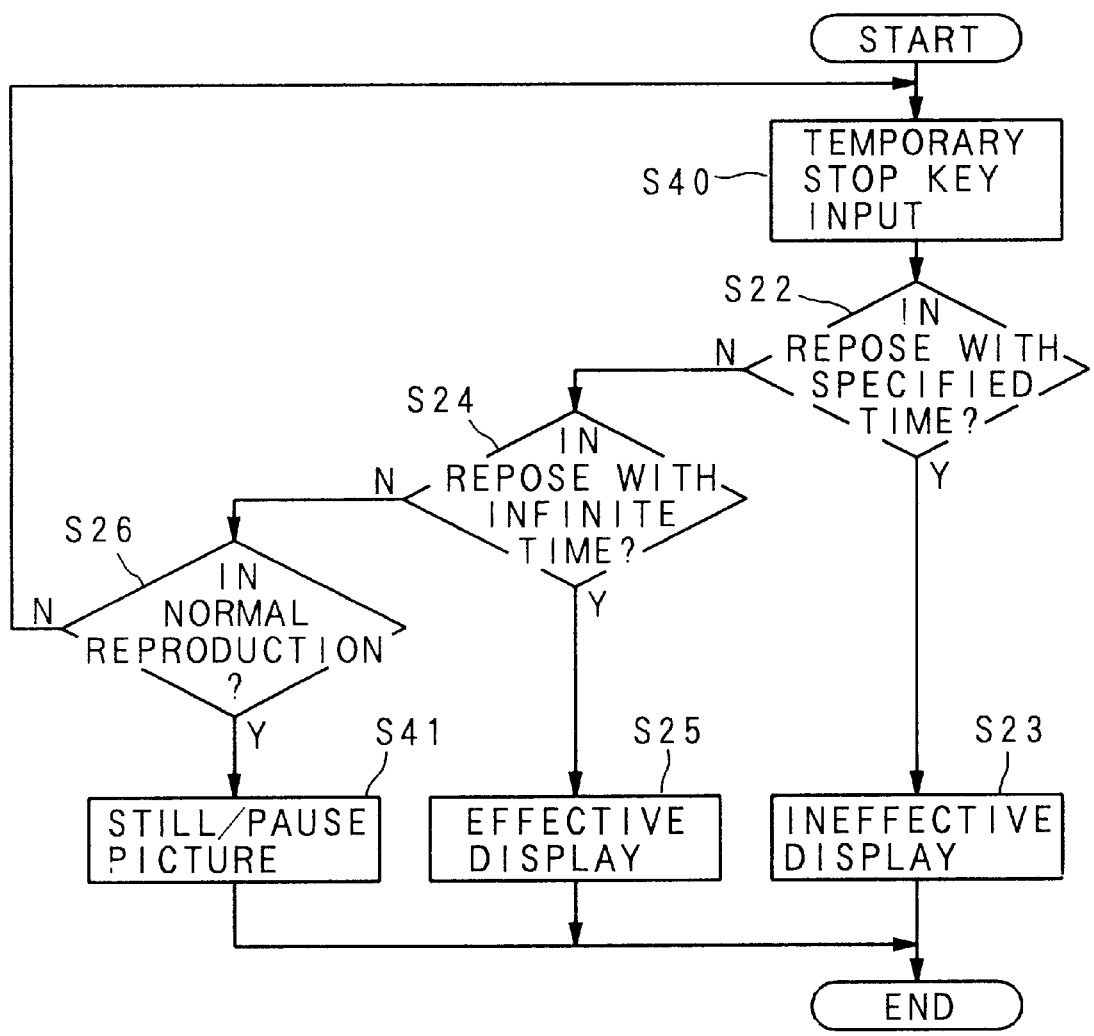
FIG. 11 is a flow chart showing an operation of an information reproducing apparatus, which is not equipped with both of a still key and a pause key, in the embodiment.

Next, another embodiment of the operation in a case where the input signal Sin including the cancel signal to stop the still picture reproduction based on the audience's intention is inputted from the still key 98A or the pause key 98B of the input unit 98 in the process at the step S14 in the operation of the reproducing apparatus SS2, and another embodiment of the operation in a case where the input signal Sin including the cancel signal to stop the still picture reproduction is inputted from the still key 98A or the pause key 98B of the input unit 98 before the specified time is elapsed during the still picture reproduction on the basis of the audience's intention at the step S13, are explained with reference to FIGS. 10A to 11.

FIG. 10A integrally shows the operations when the input signal Sin including the cancel signal to stop the still picture reproduction in each case is inputted from the still key 98A or the pause key 98B of the input unit 98.

That is, in the reproducing apparatus SS2 shown in FIG. 8, in case that the pause key 98B is actuated or in case that the still key 98A is actuated in the repose with the specified time period at the step S13, the actuation is made ineffective in order to reflect the author's intention. Then, the still picture reproduction is continued until the elapse of the specified time. An activation ineffective display as described later is performed.

On the other hand, in case that the pause key 98B is activated or in case that the still key 98A is activated in the repose with the infinite time at the step S14, the activation becomes effective in order to reflect the audience's intention. Then, the still picture reproduction is finished as mentioned above, and the operation proceeds to the reproduction for a next cell 20 (at the steps S15 and S16 in FIG. 9). An activation effective display as described later is performed.

Further, in case that the still key 98A is activated in the normal reproduction, which is not under the still picture reproduction, the still picture reproduction (still picture) is started at that timing. In case that the pause key 98B is activated in the normal reproduction, an operation is started in which the picture signal Svp is not outputted to a displaying section at that timing (the displaying section has a so-called pause picture).

Next, the above mentioned operation is explained with reference to a flow chart shown in FIG. 10B. When any key is firstly inputted (Step S20), it is judged whether or not the key is the still key 98A (Step S21). If it is the still key 98a (Step S21; YES), it is judged whether or not it is in the repose with the specified time (Step S13 in FIG. 9) (Step S22). If it is in the repose with the specified time (Step S22; YES), it is determined that the activation of the still key 98A is ineffective. Then, the ineffective display is performed (Step S23). The process is ended.

The ineffective display in this case, for example, displays a remaining time until the end of the still picture reproduction, or generates a beep tone and the like to thereby give the audience a warning.

On the other hand, if it is not in the repose with the specified time in the judgment at the step S22 (Step S22; NO), it is judged whether or not it is in the repose with the infinite time (Step S24). If it is in the repose with the infinite time (Step S24; YES), it is determined that the activation of the still key 98A is effective. Then, the effective display is performed (Step S25). The process is ended.

The effective display in this case, for example, finishes the still picture reproduction to thereby move to the reproduction for the next cell 20 (the steps S15 and S16 of FIG. 9), or stops the still picture reproduction to thereby perform a so-called blue back display (a display picture is made blue as a whole), a squelch display (a picture display on which the picture signal Svp is not displayed), a so-called screen saver display (a predetermined picture (having no relation with a presently reproduced picture) is outputted in order to protect the sticking of the display picture) or the like.

Incidentally, it is possible to move to the normal reproduction operation after performing the activation effective display. In this case, for example, the operation is processed as described below. Namely, when the still key 98A is activated in the repose with the infinite time, the activation effective display is performed. When the still key 98A is further activated after that, the operation returns back to the originally infinite time still picture reproduction. When the still key 98A is furthermore activated after that, the operation returns back to the normal dynamic picture reproduction.

Next, if it is not in the repose with the infinite time (Step S24; NO) in the judgment at the step S24, it is judged whether or not it is in the normal reproduction (Step S26). In case of the normal reproduction (Step S26; YES), it is determined that the activation of the still key 98A is effective. Then, in order to perform the still picture reproduction that is the primary function thereof, the still picture is displayed at a timing when the still key 98A is activated (Step S27). Then, the process is ended.

On the other hand, in case that it is not in the repose with the normal reproduction (Step S26; NO) in the judgment at the step S26, the flow returns to the step S20 so as to wait for a next key input.

Moreover, in case that it is not the still key 98A (Step S21; NO) in the judgment at the step S21, it is judged whether or not the activated key is the pause key 98B (Step S28). In case that it is the pause key 98B (Step S28; YES), it is judged whether or not it is in the repose with the specified time (Step S29). In case that it is in the repose with the specified time (Step S29; YES), the process at the step S23 is performed. Then, the process is ended.

On the other hand, in case that it is not in the repose with the specified time (Step S29; NO) in the judgment at the step S29, it is judged whether or not it is in the repose with the infinite time (Step S30). In case that it is in the repose with the infinite time (Step S30; YES), the process at the step S25 is performed. Then, the process is ended.

Next, in case that it is not in the repose with the infinite time (Step S30; NO) in the judgment at the step S30, it is judged whether or not it is in the normal reproduction (Step S31). In case that it is in the normal reproduction (Step S31; YES), the pause picture is displayed (Step S32) in order to make the function of the still picture reproduction that is the primary function of the pause key 98B effective. Then, the process is ended.

On the other hand, in case that it is not in the normal reproduction (Step S31; NO) in the judgment at the step S31, the operation proceeds to the step S20 in order to wait for a next key input.

As explained above, in the repose with the specified time, the activation of the still key 98A or the pause key 98B is made ineffective. Then, the still picture reproduction is continued until the elapse of the specified time. Further, in the repose with the infinite time, the activation of the still key 98A or the pause key 98B is made effective. Accordingly, it is possible to prevent the still picture specifying time from being carelessly shorten, and also possible to stop the still picture reproduction according to the audience's intention in the repose with the infinite time.

As a result, it is possible to perform the reproduction reflecting the author's intention of the record information R and also possible to perform the reproduction reflecting the audience's intention.

In each case that the still key 98A or the pause key 98B is activated, the effective display indicative of the effectiveness or the ineffective display indicative of the ineffectiveness is performed. Thus, in each case, the audience can recognize that the activation of the still key 98A or the pause key 98B is effective or ineffective.

The flow chart shown in FIG. 10B indicates the case where the input unit 98 has the still key 98A and the pause key 98B such as the reproducing apparatus SS2 shown in FIG. 8. Besides, in an information reproducing apparatus using just one temporary stop key commonly as both of the still key and the pause key at the input unit, as for each of the above mentioned operations, as shown in FIG. 10A, in a case of determining that the temporary stop key is activated in the repose with the specified time, the activation is made ineffective, and then the ineffective display can be performed. In a case of determining that the temporary stop key is activated in the repose with the infinite time, the activation is made effective, and then the effective display can be performed.

An operation in this case is explained with reference to a flow chart shown in FIG. 11. At first, it is judged whether or not the temporary stop key is activated (Step S40). After that, the operations at the steps S22 to 826 shown in FIG. 10B are performed.

Then, if it is in the normal reproduction in the judgment at the step S26 (Step S26; YES), the still picture or the pause picture corresponding to the temporary stop is displayed (Step S41). Then, the process is ended.

According to the above mentioned operations, even the reproducing apparatus, which does not have both of the still key and the pause key, can obtain the effect similar to that of the reproducing apparatus SS2 shown in FIG. 10B.

In each of the above mentioned embodiments, it has been explained the case where the record information R is recorded on the DVD 1 and then this is reproduced. However, the present invention is not limited thereto. It is possible to apply to various information record mediums other than the DVD 1.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An information recording apparatus comprising:
   a signal process means for applying a predetermined signal process to record information to be recorded, thereby obtaining a plurality of processed partial record information pieces, each including video information;
   an additional information generating means for generating additional information including still time information indicating a time period during which still picture reproduction of a picture in each of the processed partial record information pieces is to be performed by a reproducing apparatus;
   a multiplex means for multiplexing the processed partial record information pieces and the additional information to thereby generate multiplexed processed record information; and
   a record means for recording the multiplexed processed record information onto an information record medium.

2. The information recording apparatus according to claim 1, wherein the still time information is time specifying still time information indicating a predetermined time period set in advance.

3. The information recording apparatus according to claim 1, wherein the still time information is infinite still time information indicating that the still picture reproduction is to be continued until a cancel signal to stop the still picture reproduction is provided from an external during the still picture reproduction.

4. The information recording apparatus according to claim 1, wherein
   each of the processed partial record information pieces is divided into a plurality of divided partial record information, and
   said additional information further includes still specifying information to perform still picture reproduction of a picture in each of the divided partial record information after reproducing each of the divided partial record information.

5. The information recording apparatus according to claim 1, wherein
   said additional information includes a plurality of still time informations, which correspond to same one of said partial record information pieces and which respectively indicate times to perform the still picture reproduction different from each other, and
   said multiplex means multiplexes said processed partial record information pieces and said additional information so as to record said additional information at a record position on said information record medium, which is different from a portion where said record information is recorded and which is reproduced prior to the reproduction of said record information.

6. An information record medium to be reproduced by a reproducing apparatus, comprising:
   a main region for recording a plurality of processed partial record information pieces, each including video information; and
   a time information region for recording additional information including still time information indicating a time period during which still picture reproduction of a picture in each of the processed partial record information pieces is to be performed by the reproducing apparatus, wherein the additional information is multiplexed with the processed partial record information pieces so that the time information region is spread over the main region.

7. The information record medium according to claim 6, wherein the still time information is time specifying still time information indicating a predetermined time period set in advance.

8. The information record medium according to claim 6, wherein the still time information is infinite still time information indicating that the still picture reproduction is to be continued until a cancel signal to stop the still picture reproduction is provided from an external during the still picture reproduction.

9. The information record medium according to claim 6, wherein
   each of said processed partial record information pieces is divided into a plurality of divided partial record information, and
   said additional information further includes still specifying information to perform still picture reproduction of a picture in each of the divided partial record information after reproducing each of the divided partial record information.

10. The information record medium according to claim 6, wherein
    said additional information includes a plurality of still time informations, which correspond to same one of said partial record information pieces and which respectively indicate times to perform the still picture reproduction different from each other, and
    said additional information is recorded at a record position on said information record medium, which is different from a portion where said record information is recorded and which is reproduced prior to the reproduction of said record information.

11. An information record medium to be reproduced by a reproducing apparatus, comprising:
    a first region for recording a plurality of first data groups, each including navigation information and video information;
    a second region for recording a plurality of second data groups, each including a plurality of the first data groups; and
    a third region for recording additional information including a plurality of group information each of which corresponds to one of the plurality of second data groups, wherein each of the group information includes still time information indicating a time period during which still picture reproduction of a picture in the corresponding second data group is to be performed by the reproducing apparatus.

12. The information record medium according to claim 11, wherein the still time information is time specifying still time information indicating a predetermined time period set in advance.

13. The information record medium according to claim 11, wherein the still time information is infinite still time information indicating that the still picture reproduction is to be continued until a cancel signal to stop the still picture reproduction is provided from an external during the still picture reproduction.

14. The information record medium according to claim 11, wherein said additional information further includes still specifying information to perform still picture reproduction of a picture in each of the first data groups after reproducing each of the first data groups.

15. An information reproducing apparatus for reproducing information recorded on an information record medium comprising a plurality of processed partial record information pieces each including video information, and additional information including still time information indicating a time period during which still picture reproduction of a picture in each of the processed partial record information pieces is to be performed by the reproducing apparatus, said apparatus comprising:

detection and demodulation means for detecting and demodulating the information recorded on the recording medium to obtain a demodulation signal, the demodulation signal including the processed partial record information pieces multiplexed with the additional information;

extracting means for extracting the additional information from the demodulation signal; and control means for controlling the still picture reproduction of the picture in each of the processed partial record information pieces on the basis of the still time information included in the extracted additional information.

16. The information reproducing apparatus according to claim 15, wherein the still time information is time specifying still time information indicating a predetermined time period set in advance, and the control means controls the still picture reproduction of the picture in each of the processed partial record information pieces in a period that the time specifying still time information indicates.

17. The information reproducing apparatus according to claim 15, wherein the still time information is infinite still time information, and the control means continues the still picture reproduction until a cancel signal to stop the still picture reproduction is provided from an external during the still picture reproduction on the basis of the infinite still time information.

18. The information reproducing apparatus according to claim 15, wherein said additional information includes a plurality of still time informations, which correspond to same one of said partial record information pieces and which respectively indicate times to perform the still picture reproduction different from each other, and said control means controls said detection and demodulation means and said extract means to reproduce said additional information prior to the reproduction of said record information other than said additional information.

19. The information reproducing apparatus according to claim 15, wherein said still time information includes: time specifying still time information to perform the still picture reproduction of said final picture for a predetermined time period set in advance; and infinite still time information to continue the still picture reproduction of said final picture until a still picture reproduction cancel signal to stop said still picture reproduction is inputted from the external during the still picture reproduction, and said control means controls the still picture reproduction of said final picture, on the basis of said time specifying still time information and said infinite still time information.

20. The information reproducing apparatus according to claim 19, wherein said information reproducing apparatus further comprises an input means for inputting said still picture reproduction cancel signal therethrough, and said control means controls said still picture reproduction cancel signal to be ineffective when said still picture reproduction cancel signal is inputted through said input means in case that the still picture reproduction of said final picture is performed on the basis of said time specifying still time information, and to be effective when said still picture reproduction cancel signal is inputted through said input means in case that the still picture reproduction of said final picture is performed on the basis of said infinite still time information.

21. The information reproducing apparatus according to claim 20, wherein said information reproducing apparatus further comprises a display means, and said control means controls said display means to display such a message that said still picture reproduction cancel signal is ineffective when said still picture reproduction cancel signal is inputted through said input means in case that the still picture reproduction of said final picture is performed on the basis of said time specifying still time information.

22. The information reproducing apparatus according to claim 20, wherein said information reproducing apparatus further comprises a display means, and said control means controls said display means to display such a message that said still picture reproduction cancel signal is effective when said still picture reproduction cancel signal is inputted through said input means in case that the still picture reproduction of said final picture is performed on the basis of said infinite still time information.

23. An information reproducing apparatus for reproducing information recorded on an information record medium comprising a plurality of first data groups, each including navigation information and video information, a plurality of second data groups, each including a plurality of the first data groups, and additional information including a plurality of group information each of which corresponds to each one of the plurality of second data groups, wherein each of the group information includes still time information indicating a time period during which still picture reproduction of a picture in the corresponding second data group is to be performed by the reproducing apparatus, said apparatus comprising:

detection and demodulation means for detecting and demodulating information recorded on the recording medium, thereby obtaining a demodulation signal;

extracting means for extracting the additional information from the demodulation signal; and control means for controlling the still picture reproduction of the picture of each of the second data groups on the basis of the still time information included in the extracted additional information.

24. The information reproducing apparatus according to claim 23, wherein the still time information is time specifying still time information indicating a predetermined time period set in advice, and the control means controls the still picture reproduction of the picture of each of the partial record information pieces in a period that the time specifying still time information indicates.

25. The information reproducing apparatus according to claim 23, wherein the still time information is infinite still time information, and the control means continues the still picture reproduction until a cancel signal to stop the still picture reproduction is provided from an external during the still picture reproduction on the basis of the infinite still time information.

26. The information reproducing apparatus according to claim 23, wherein said additional information includes a plurality of still time informations, which correspond to same one of said partial record information pieces and which respectively indicate times to perform the still picture reproduction different from each other, and said control means controls said detection and demodulation means and said extract means to reproduce said additional information prior to the reproduction of said record information other than said additional information.

27. The information reproducing apparatus according to claim 23, wherein said still time information includes: time specifying still time information to perform the still picture reproduction of said final picture for a predetermined time period set in advance; and infinite still time information to continue the still picture reproduction of said final picture until a still picture reproduction cancel signal to stop said still picture reproduction is inputted from the external during the still picture reproduction, and said control means controls the still picture reproduction of said final picture, on the basis of said time specifying still time information and said infinite still time information.

28. The information reproducing apparatus according to claim 27, wherein said information reproducing apparatus further comprises an input means for inputting said still picture reproduction cancel signal therethrough, and said control means controls said still picture reproduction cancel signal to be ineffective when said still picture reproduction cancel signal is inputted through said input means in case that the still picture reproduction of said final picture is performed on the basis of said time specifying still time information, and to be effective when said still picture reproduction cancel signal is inputted through said input means in case that the still picture reproduction of said final picture is performed on the basis of said infinite still time information.

29. The information reproducing apparatus according to claim 28, wherein said information reproducing apparatus further comprises a display means, and said control means controls said display means to display such a message that said still picture reproduction cancel signal is ineffective when said still picture reproduction cancel signal is inputted through said input means in case that the still picture reproduction of said final picture is performed on the basis of said time specifying still time information.

30. The information reproducing apparatus according to claim 28, wherein said information reproducing apparatus further comprises a display means, and said control means controls said display means to display such a message that said still picture reproduction cancel signal is effective when said still picture reproduction cancel signal is inputted through said input means in case that the still picture reproduction of said final picture is performed on the basis of said infinite still time information.

\* \* \* \* \*